US012671938B2

(12) United States Patent
Kaetel

(10) Patent No.: US 12,671,938 B2
(45) Date of Patent: Jun. 30, 2026

(54) LOUDSPEAKER SYSTEM, METHOD FOR MANUFACTURING THE LOUDSPEAKER SYSTEM, SOUND SYSTEM FOR A PRESENTATION AREA, AND PRESENTATION AREA

(71) Applicant: Kaetel Systems GmbH, Munich (DE)

(72) Inventor: Klaus Kaetel, Munich (DE)

(73) Assignee: KAETEL SYSTEMS GMBH, Munich (DE)

(*) Notice: Subject to any disclaimer, the term of this patent is extended or adjusted under 35 U.S.C. 154(b) by 202 days.

(21) Appl. No.: 18/481,396

(22) Filed: Oct. 5, 2023

(65) Prior Publication Data

US 2024/0031735 A1 Jan. 25, 2024

Related U.S. Application Data

(63) Continuation of application No. PCT/EP2022/059310, filed on Apr. 7, 2022.

(30) Foreign Application Priority Data

Apr. 13, 2021 (DE) ..................... 10 2021 203 639.2

(51) Int. Cl.
*H04R 1/32* (2006.01)

(52) U.S. Cl.
CPC .................................... *H04R 1/323* (2013.01)

(58) Field of Classification Search
CPC ........ H04R 3/12; H04R 1/025; H04R 1/2842; H04R 1/403; H04R 5/02; H04R 1/2803;
(Continued)

(56) References Cited

U.S. PATENT DOCUMENTS 4,316,058 A 2/1982 Christensen
4,391,346 A * 7/1983 Murakami ............... H04R 1/24 181/147
(Continued)

FOREIGN PATENT DOCUMENTS

CN 101444110 A 5/2009
CN 101816188 A 8/2010
(Continued)

OTHER PUBLICATIONS

International Search Report and Written Opinion issued in application No. PCT/EP2022/059310.
(Continued)

*Primary Examiner* — Mark Fischer
(74) *Attorney, Agent, or Firm* — McClure, Qualey & Rodack, LLP

(57) ABSTRACT

A loudspeaker system includes: a first sound generator with a first emission direction, and a second sound generator with a second emission direction, wherein the first sound generator and the second sound generator are arranged with respect to each other such that the first emission direction and the second emission direction intersect in a sound chamber; a third sound generator with a third emission direction, and a fourth sound generator with a fourth emission direction, wherein the third sound generator and the fourth sound generator are arranged such that the third emission direction and the fourth emission direction intersect in the sound chamber; and a housing that accommodates the first sound generator and the second sound generator, the third sound generator and the fourth sound generator, and the sound chamber, wherein the housing has a gap configured to enable gas communication between the sound chamber and a surrounding area.

35 Claims, 13 Drawing Sheets

(58) Field of Classification Search
CPC ......... H04R 1/227; H04S 3/008; H04S 7/307; H04S 2400/01
See application file for complete search history.

(56) References Cited

U.S. PATENT DOCUMENTS

| | | | |
|---|---|---|---|
| 5,590,214 | A | 12/1996 | Nakamura |
| 6,122,381 | A | 9/2000 | Winterer |
| 7,277,552 | B2 | 10/2007 | Graber |
| 9,982,832 | B1 | 5/2018 | Nicolas |
| 2009/0147980 | A1 | 6/2009 | Fincham |
| 2015/0189439 | A1 | 7/2015 | Starobin |
| 2016/0241962 | A1 | 8/2016 | Kaetel |
| 2018/0167722 | A1 | 6/2018 | Christner |
| 2021/0092510 | A1 | 3/2021 | Darling |

FOREIGN PATENT DOCUMENTS

| | | | |
|---|---|---|---|
| CN | 103248981 | A | 8/2013 |
| CN | 107079208 | A | 8/2017 |
| CN | 107431865 | B | 10/2019 |
| DE | 23 17 123 | A1 | 11/1973 |
| DE | 10 2013 221 754 | A1 | 4/2015 |
| EP | 0 808 076 | A1 | 11/1997 |
| EP | 3 061 266 | A | 8/2016 |
| EP | 2 692 144 | B1 | 2/2017 |
| EP | 2 692 154 | B1 | 9/2017 |
| EP | 2 692 151 | B1 | 1/2018 |
| EP | 3 061 262 | B1 | 1/2018 |
| EP | 3 439 330 | B1 | 10/2020 |
| JP | 2004147268 | A | 5/2004 |
| NL | 2 015 783 | B1 | 6/2017 |
| WO | 2010/105280 | A1 | 9/2010 |
| WO | 2015/059291 | A1 | 4/2015 |
| WO | 2016/118779 | A1 | 7/2016 |
| WO | 2018/208675 | A2 | 11/2018 |

OTHER PUBLICATIONS

Graham Audio; "LS5/5—Graham Audio—British manufacturers of high quality loudspeaker systems;" Aug. 2020; pp. 1-3.
Chinese language office action dated 2026-03-23, issued in application No. CN 2022800370302 (English language translation, pp. 1-13 of attachment).

* cited by examiner

| no. | original base push-pull signal /81 |
|---|---|
| 1 | separate recording and/or processing (Fig. 2a) |
| 2 | calculation from side-signal (Fig. 4b) |
| 3 | derivation from common-mode signal (Fig. 4c) |
| ⋮ | ⋮ |

LOUDSPEAKER SYSTEM, METHOD FOR MANUFACTURING THE LOUDSPEAKER SYSTEM, SOUND SYSTEM FOR A PRESENTATION AREA, AND PRESENTATION AREA

CROSS-REFERENCE TO RELATED APPLICATIONS

This application is a continuation of copending International Application No. PCT/EP2022/059310, filed Apr. 7, 2022, which is incorporated herein by reference in its entirety, and additionally claims priority from German Application No. 10 2021 203 639.2, filed Apr. 13, 2021, which is also incorporated herein by reference in its entirety.

TECHNICAL FIELD

The present invention relates to audio signal processing and reproduction, and in particular to a loudspeaker system with at least four sound generators for generating a dual mode signal comprising common mode components and push-pull components. Furthermore, the present invention relates to a sound system for a presentation area, and to a presentation area.

BACKGROUND OF THE INVENTION

Typically, acoustic scenes are recorded using a set of microphones. Each microphone outputs a microphone signal. For example, 25 microphones may be used for an audio scene of an orchestra. A sound engineer then mixes the 25 microphone output signals, e.g., into a standard format such as a stereo format, a 5.1 format, a 7.1 format, a 7.2 format, or any other corresponding format. In case of a stereo format, e.g., the sound engineer or an automatic mixing process generates two stereo channels. In the case of a 5.1 format, mixing results in five channels and one subwoofer channel. Analogously, in case of a 7.2 format, e.g., mixing results in seven channels and two subwoofer channels. If the audio scene is to be rendered in a reproduction environment, a mixing result is applied to electrodynamic loudspeakers. In a stereo reproduction scenario, there are two loudspeakers, the first loudspeaker receiving the first stereo channel and the second loudspeaker receiving the second stereo channel. For example, in a 7.2 reproduction format, there are seven loudspeakers at predetermined positions, and two subwoofers, which can be placed relatively arbitrarily. The seven channels are applied to the corresponding loudspeakers, and the subwoofer channels are applied to the corresponding subwoofers.

The use of a single microphone arrangement when capturing audio signals, and the use of a single loudspeaker arrangement when reproducing the audio signals typically neglects the true nature of the sound sources. European patent EP 2692154 B1 describes a set for capturing and reproducing an audio scene, in which not only the translation but also the rotation and, in addition, the vibration is captured and reproduced. Thus, a sound scene is not only reproduced by a single capturing signal or a single mixed signal but by two capturing signals or two mixed signals that, on the one hand, are recorded simultaneously, and that, on the other hand, are reproduced simultaneously. This ensures that different emission characteristics of the audio scene are recorded compared to a standard recording, and are reproduced in a reproduction environment.

To this end, as is illustrated in the European patent, a set of microphones is placed between the acoustic scene and a (imaginary) listener space to capture the "conventional" or translation signal that is characterized by a high directionality, or high quality.

In addition, a second set of microphones is placed above or to the side of the acoustic scene to record a signal with lower quality, or lower directionality, that is intended to represent the rotation of the sound sources in contrast to the translation.

On the reproduction side, corresponding loudspeakers are placed at the typical standard positions, each of which has a omnidirectional arrangement to reproduce the rotation signal, and a directional arrangement to reproduce the "conventional" translational sound signal. In addition, there is a subwoofer at each of the standard positions, or there is only a single subwoofer at an arbitrary location.

European patent EP 2692144 B1 discloses a loudspeaker for reproducing, on the one hand, the translational audio signal and, on the other hand, the rotatory audio signal. The loudspeaker has, on the one hand, an arrangement that emits in an omnidirectional manner, and, on the other hand, an arrangement that emits in a directional manner.

European patent EP 2692151 B1 discloses an electret microphone that can be used for recording the omnidirectional or the directional signal.

European patent EP 3061262 B1 discloses earphones and a method for manufacturing earphones that generate both a translational sound field and a rotatory sound field.

European patent application EP 3061266 A0, which is intended for grant, discloses earphones and a method for producing earphones configured to generate the "conventional" translational sound signal by using a first transducer, and to generate the rotatory sound field by using a second transducer arranged perpendicular to the first transducer.

Recording and reproducing the rotatory sound field in addition to the translational sound field leads to a significantly improved and therefore high-quality audio signal perception that almost conveys the impression of a live concert, even though the audio signal is reproduced by the loudspeaker or headphones or earphones.

This achieves a sound experience that can almost not be distinguished from the original sound scene in which the sound is not emitted by loudspeakers but by musical instruments or human voices. This is achieved by considering that the sound is emitted not only translationally but also in a rotary manner and possibly also in a vibrational manner, and is therefore to be recorded and reproduced accordingly.

A disadvantage of the concept described is that recording the additional signal that reproduces the rotation of the sound field represents a further effort. In addition, there are many pieces of music, for example classical pieces or pop pieces, where only the conventional translational sound field has been recorded. Typically, the data rate of these pieces is heavily compressed, e.g., according to the MP3 standard or the MP4 standard, contributing to an additional deterioration of quality, however, which is typically only audible for experienced listeners. On the other hand, there are almost no audio pieces that have not been recorded at least in the stereo format, with a left channel and a right channel. Rather, the development goes towards generating more channels than only a left and a right channel, i.e. generating surround recordings with five channels or even recordings with higher formats, for example, which is known under the keyword MPEG surround or Dolby Digital in the technology.

Thus, there are many pieces that have been recorded at least in the stereo format with a first channel for the left side and a second channel for the right side. There are even more and more pieces where recording has been done with more than two channels, e.g., for a format with several channels on the left side and several channels on the right side and one channel in the center. Even higher level formats use more than five channels in the horizontal plane and in addition also channels from above or channels from obliquely above and possibly also, if possible, channels from below.

In particular, the provision of loudspeakers for reproducing the translational component, or common-mode component, and the rotatory component, or the push-pull component, has been elaborate and not very compact. This is not critical if there is enough space for large loudspeakers. However, if more compact loudspeakers are to be used, the existing concept with separate sound generators for the translational component on the one hand and for the rotatory component on the other hand is not optimal.

Thus, the object of the present invention is to provide an improved concept for high-quality loudspeaker systems.

SUMMARY

According to an embodiment, a loudspeaker system may have: a first sound generator with a first emission direction, and a second sound generator with a second emission direction, wherein the first sound generator and the second sound generator are arranged with respect to each other such that the first emission direction and the second emission direction intersect in a sound chamber; a third sound generator with a third emission direction, and a fourth sound generator with a fourth emission direction, wherein the third sound generator and the fourth sound generator are arranged with respect to each other such that the third emission direction and the fourth emission direction intersect in the sound chamber; and a housing that accommodates the first sound generator and the second sound generator, the third sound generator and the fourth sound generator, and the sound chamber, wherein the housing has a gap configured to enable gas communication between the sound chamber and a surrounding area of the loudspeaker system.

According to another embodiment, a sound system may have: a first inventive loudspeaker system configured as mentioned above; and a second inventive loudspeaker system configured as mentioned above, wherein the second loudspeaker system is arranged on top of the first loudspeaker system, and wherein the housing of the first loudspeaker system is configured to be separate from the housing of the second loudspeaker system.

According to another embodiment, a presentation area may have: a sound system having: a first inventive loudspeaker system configured as mentioned above; and a second inventive loudspeaker system configured as mentioned above, wherein the second loudspeaker system is arranged on top of the first loudspeaker system, and wherein the housing of the first loudspeaker system is configured to be separate from the housing of the second loudspeaker system; and a listening area, wherein the listening area has a first listening row and a second listening row, wherein the second listening row is arranged above and offset with respect to the first listening row.

According to another embodiment, a method for manufacturing a loudspeaker system having a first sound generator with a first emission direction, and a second sound generator with a second emission direction, a third sound generator with a third emission direction, and a fourth sound generator with a fourth emission direction, may have the steps of: arranging the first sound generator and the second sound generator with respect to each other such that the first emission direction and the second emission direction intersect in a sound chamber; arranging the third sound generator with a third emission direction and the fourth sound generator with a fourth emission direction such that the third emission direction and the fourth emission direction intersect in the sound chamber; and accommodating the loudspeaker system with a housing that accommodates the first sound generator and the second sound generator, the third sound generator and the fourth sound generator, and the sound chamber, wherein the housing has a gap configured to enable gas communication between the sound chamber and a surrounding area of the loudspeaker system.

The present invention is based on the finding that, with respect to the loudspeaker system, a first sound generator with a first emission direction and a second sound generator with a second emission direction and a third sound generator with a third emission direction and a fourth sound generator with a fourth emission direction are used, wherein the sound generators are arranged with respect to each other such that a first emission direction of the first sound generator and a second emission direction of the second sound generator intersect in a sound chamber and advantageously have an intersection angle that is greater than 60° and smaller than 120°. In addition, the third sound generator and the fourth sound generator are arranged such that they also emit into the same sound chamber into which the other two sound generators emit as well. Furthermore, the at least four sound generators and the sound chamber are accommodated in a housing, wherein the housing comprises a gap that is configured to enable gas communication between the sound chamber and a surrounding area of the loudspeaker system.

With respect to the signal processor, the first sound generator and the second sound generator are driven such that a common-mode signal supplied to the first sound generator and the second sound generator is overlapped with a push-pull signal so as to obtain the control signal for the first sound generator. Furthermore, the common-mode signal is overlapped with a second push-pull signal so as to obtain the control signal for the second sound generator. The two push-pull signals differ from each other. Advantageously, the third sound generator is driven on the basis of the same signal as the first sound generator, and the fourth sound generator is driven on the basis of the same signal as the first sound generator. Thus, a line sound source is created from two point sound sources that would be emitted by only one pair of sound generators each. This effect becomes greater the more pairs of sound generators are arranged in the same housing and emit into the same sound chamber. Therefore, it is of advantage to arrange even more than two pairs, e.g., more than three pairs or more than five pairs or 8 eight pairs, of sound generators in the same housing above the other so that all of the sound generators emit into the same sound chamber. This results in respective rear chambers behind the sound generators, which may be separated from each other and which also separated from the sound chamber communicating with the gap.

This achieves that each pair of sound transducers together reproduces the common-mode signal, i.e. the translational component, and the push-pull signal, i.e. the rotatory component. Due to the fact that the sound emission of the four or more sound generators is mixed in the sound chamber, and due to the fact that a gap is provided in the housing, through which the sound can exit from the sound chamber into the surrounding area of the loudspeaker, it is achieved that the exiting sound has translational and rotatory components, i.e. common mode parts and push-pull parts. In particular, it has been shown that, when leaving the gap, the sound has sound particle velocity vectors that represent the translational component, directed away from the propagation direction of the sound transducer. These sound particle velocity vectors representing the translational component are directed towards the source or away from the source, and change their length, however, they do not rotate. It has been found at the same time, however, due to the arrangement of the sound generators in the sound chamber, the generated output sound signal also comprises sound particle velocity vectors that rotate, and therefore generate a rotatory sound signal in the surrounding area of the loudspeaker, which, together with the translational sound field, leads to the audio perception becoming particularly natural. Due to the plurality of pairs of sound generators, listeners have the impression of a line sound source. This is of particular advantage if several loudspeaker systems are arranged together in a presentation area and are to reproduce a special channel, such as the center channel, in a spatially limited manner.

In contrast to conventional transducers that only generate a translational sound field, the quality of the inventive loudspeaker system is superior because, in addition to the translational sound field, the rotatory sound field is generated as well, creating a particularly high-quality almost "live" impression. On the other hand, the generation of these particularly natural sound fields with translational and rotational components, i.e. with linear and rotating sound particle velocity vectors, is particularly compact because two sound generators arranged obliquely to each other in one sound chamber generate the combined sound field that exits through a gap.

According to an aspect of the present invention, the loudspeaker system is arranged to be separate from the signal processor. In such an embodiment, the loudspeaker system has two signal inputs that may be wired or wireless, wherein a signal for one sound generator in the loudspeaker system is generated at each signal input. The signal processor providing the control signals for the sound generators is arranged remotely from the actual loudspeaker system and is connected to the loudspeaker system via a communication link, such as a wired link or a wireless link. The two or more pairs of sound generators are each driven by the same signals. This means that, when the pairs of sound generators are each arranged one above the other, one sound generator of a pair always receives the first signal and the other sound generator of the pair always receive the second signal as the control signal. This is also done for the other pairs.

In an another embodiment, the signal processor is integrated into the loudspeaker system. In such a case, in the loudspeaker system with the integrated signal processor, the common-mode signal is derived and, according to the implementation and the embodiment, the push-pull signal is derived separately, or from the common-mode signal. An aspect of the present invention therefore concerns the loudspeaker system without a signal processor. Another aspect of the present invention therefore also concerns the signal processor without a loudspeaker system, and a further aspect of the present invention concerns the loudspeaker system with an integrated signal processor.

In embodiments, the two push-pull signals are derived from a base push-pull signal by using two all-pass filter processes, wherein, in an embodiment, the base push-pull signal is filtered with a first all-pass filter so as to generate the first push-pull signal directly or, possibly, by using further processing steps. The base push-pull signal is filtered with a second all-pass filter that differs from the first all-pass filter so as to generate the second push-pull signal for the second sound generator in the loudspeaker system directly or, possibly, by using further processing steps.

According to the implementation, filterbank processing may be performed in the push-pull signal processing, wherein two interleaved, or interlocked, or "interlaced", filterbanks are provided in the two processing branches for the two push-pull signals. Through this, the push-pull signal of the two sound transducers is interleaved in terms of frequency, so to speak, or is brought into the sound chamber in a frequency-multiplexed way. It has been shown that, in such a case, to at least partially separate the sound output of the first sound generator from the sound output of the second sound generator, a partition wall in the sound chamber is not required. In contrast, if interleaved filterbank processing is not carried out, but the two push-pull signals essentially have identical frequency components across the entire frequency range, it is of advantage to provide a partition wall in the sound chamber, which leads to an increase of the ratio of the rotating sound particle velocity vectors in the output signal and, at the same time, to an overall more efficient sound output.

The base push-pull signal processed by using advantageously two different all-pass filters to generate the two push-pull signals for the two sound generators in the loudspeaker system may be obtained in different ways. It is one possibility to record this signal directly in a separate way with certain microphone arrangements and to generate it as a combined audio representation together with the translational or common-mode signal. This ensures that the common-mode signal for the translational sound component and the push-pull signal for the rotational sound component are not mixed in the inventive signal processor on the way from the recording to the reproduction.

In an alternative embodiment, e.g., if the separate rotatory component signal is not present and there is only a mono signal or one channel signal, the base push-pull signal may be derived from the common-mode signal by high-pass filtering and/or, possibly, attenuation or amplification.

In a further embodiment of the present invention, when there is a multi-channel signal, e.g., a stereo signal or a signal with three or more channels, the push-pull signal is derived from this multi-channel representation. In the case of a stereo signal, e.g., a side signal representing the difference of the left and the right channel is calculated, wherein, if applicable, this side signal is then attenuated or amplified accordingly, and, according to the implementation, is mixed with a common-mode signal that is not high-pass filtered or is high-pass filtered. In principle, the side signal itself may already be used as the base push-pull signal if the output signal is a stereo signal. If the output signal has several channels, the base push-pull signal may be generated as the difference between any two channels of the multi-channel representation. Thus, for example, a difference between the left rear side and the right rear side (right surround) could be generated, or, alternatively, a difference between the center channel and one of the other four channels of a five-channel representation. In case of such a five-channel representation, a difference between left and right may be determined to generate the side signal, as is the case in a stereo representation. In a further embodiment, certain channels of the five-channel representation may be added, i.e. a two-channel downmix may be determined, from which the base push-pull signal may be obtained through calculating a difference. An exemplary implementation for generating a two-channel downmix signal consists of the addition, possibly with weighting factors, left rear (left surround!), left, and center, so as to generate a left downmix channel. To generate the right downmix channel, the right surround channel, the right channel and the center channel are again added up, possibly with weighting factors. The base push-pull signal may then be determined from the left downmix channel and the right downmix channel by calculating the difference.

Thus, there are different possibilities to derive a separate push-pull signal from conventional common-mode signals if such a push-pull signal does not (yet) exist.

BRIEF DESCRIPTION OF THE DRAWINGS

Embodiments of the present invention are subsequently described in more detail with reference to the accompanying drawings, in which.

DETAILED DESCRIPTION OF THE INVENTION

Figure 1A:
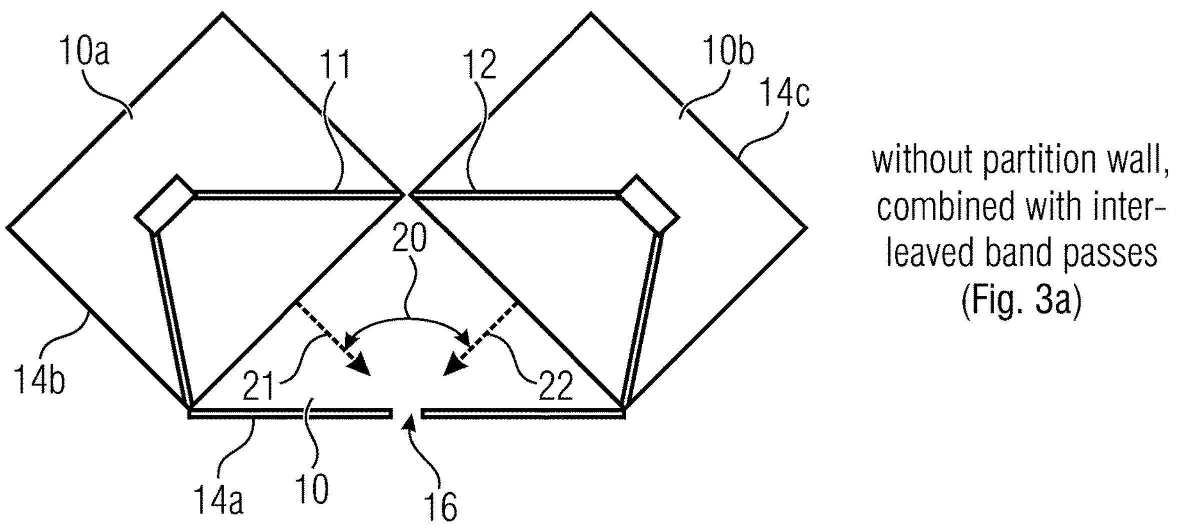
FIG. 1*a* shows a sectional view of a loudspeaker according to an aspect of the present invention.
Figure 1B:
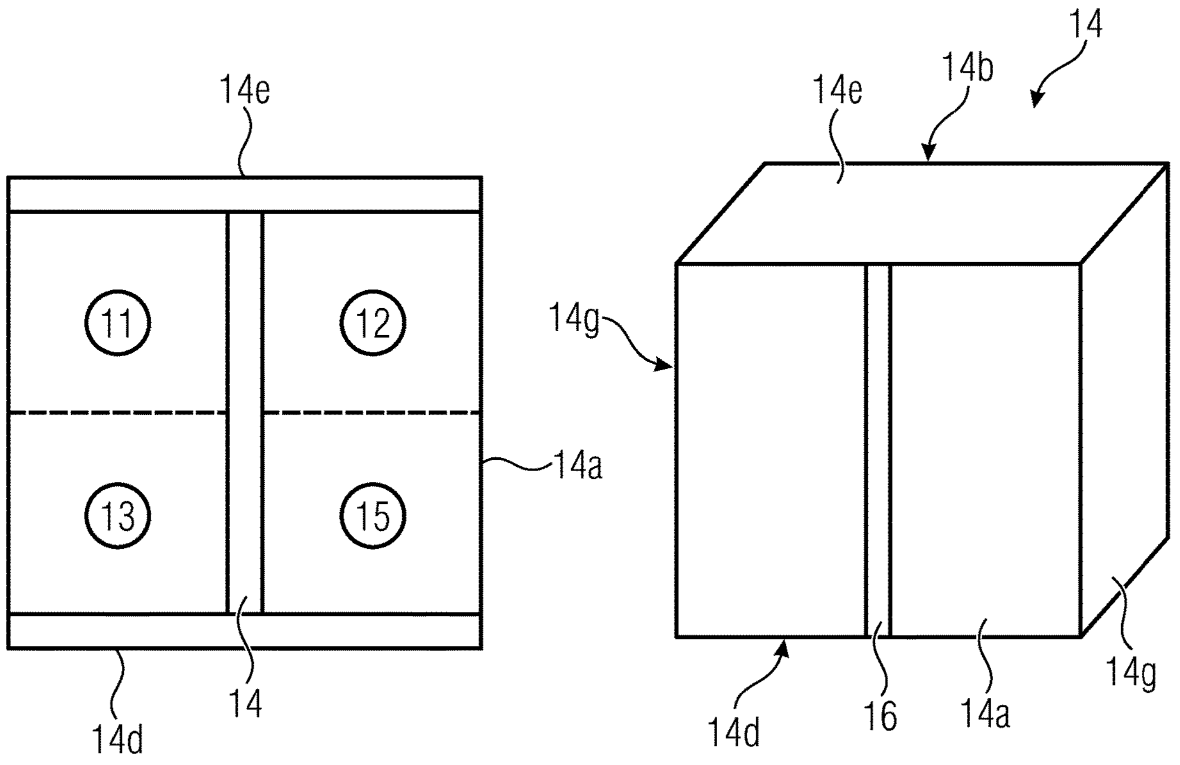
FIG. 1*b* shows a front view of a loudspeaker according to the first aspect of the invention.

FIG. 1*a* shows a loudspeaker system having a first sound generator 11 with a first emission direction 21 and a second sound generator with a second emission direction 22. Both sound generators 11, 12 are arranged with respect to each other such that the two emission directions 21, 22 intersect in a sound chamber 10 and have an intersection angle 20 that is larger than 60° and smaller than 120°. In the embodiment of FIG. 1*a*, the two sound transducers are arranged such that the emission directions of the sound generators intersect at an angle of advantageously 90°, or in an advantageous range between 80° and 100°. However, even if the sound generators are arranged such that the angle a is larger than an angle of 60°, thus, if the emission directions become more parallel, or if the angle 20 in FIG. 1*a* increases to up to 120°, i.e. if the emission directions of the sound generators are less parallel or directed more towards each other, there is a good sound emission characteristic of the loudspeaker. In addition, a third sound generator 13 with a third emission direction 23 and fourth sound generator 15 with a fourth emission direction 25 are present. They cannot be seen in the top view of FIG. 1*a*, however, they are schematically indicated in FIG. 1*b* and illustrated in detail in Fig. F. The third sound generator 13 and the fourth sound generator 15 are arranged with respect to each other such that the third emission direction 23 and the fourth emission direction 25 intersect in the sound chamber 10, so that all sound generators in the housing emit into the same sound chamber.

The sound chamber 10 is formed by the area between the membrane of the first sound generator 11 and the membrane of the second sound generator 12, the membrane of the third sound generator 13, and the membrane of the fourth sound generator 15, and a frontal wall of the housing 14, indicated with 14*a*. A gap 16 configured to enable gas communication between the sound chamber 10 within the loudspeaker system and a surrounding area of the loudspeaker system is provided in the housing 14, or in the frontal wall 14*a* of the housing 14. In particular, in the embodiment shown in FIG. 1*a*, the first sound generator 11 and the third sound generator 13 are accommodated separately with the housing 14*b*. In addition, the second sound generator 12 and the fourth sound generator 15 are in turn accommodated with a separate housing 14*c*. This ensures that the rear sides of the four sound generators 11, 12, 13, 15, i.e. the sides of the respective sound generators facing away from the sound chamber 10, do not communicate with each other, since a gas-tight seal is provided where the two sound generators touch opposite the gap. This results in the rear chambers 10*a*, 10*b* indicated in FIG. 1*g*. In addition, the sound generators themselves are sealed tight with respect to their rear side, apart from air openings used for normal sound generators, however, which are not critical for the sound generation, but just ensure pressure equalization so that the corresponding membrane of the respective sound generator can move freely.

FIG. 1*b* shows a front view of the loudspeaker system, where the gap 16 is illustrated in the front view, wherein the entire housing 14, or the sound chamber 10, is enclosed by a lid 14*e* and a bottom 14*d*. Reference numeral 14*a* indicates the frontal wall in which the gap 16 is arranged. FIG. 1 shows an embodiment of a loudspeaker system that is similar to FIG. 1*a*, however, in which a partition wall 18 having a partition wall end near the gap 16 and connected at the other side, i.e. at the side facing away from the gap, to the housing 14*b* of the first and third sound transducers and the housing 14*c* of the second and fourth sound transducer is arranged in the sound chamber 10 so that communication from the first and third sound generators to the second and fourth sound generators takes place only around the area of the partition wall end, i.e. in the area in which the gap 16 is arranged as well.

Through the reference numerals, FIG. 1*b* further schematically shows the arrangement of the at least two pairs, or four sound transducers, 11, 12, 13, 15, the dotted lines illustrating a schematic separation of the individual sound transducers. This separation for the individual sound transducers is only schematic and does not represent a separation of the sound chamber 10 or the rear chambers 10*a*, 10*b*. For example, there could be a continuous plate for each side with holes drilled in it that are the same size as the membranes, and the individual sound transducers are fixed to this plate, e.g. by screws. The two plates with the fixed individual transducers are then arranged obliquely with respect to each other, as is illustrated in the top view of FIG. 1*a* and FIG. 1*g*, so that there is the continuous sound chamber between the plates at the front, and the separated continuous rear chambers are at the back.

The right side in FIG. 1*b* shows the illustration of the housing 14 with the frontal wall 14*a*, two side walls 14*g*, the lid 14*e*, the bottom 14*d*, and the rear wall 14*h*. All walls are closed, except for the frontal wall comprising the continuous gap 16 that leads to the sound emission of the loudspeaker system being perceived as a line sound source.

In embodiments of the present invention, the partition wall 18 is provided if the signal generation for the push-pull signal for the respective sound generator is carried out such that the frequency content of the two push-pull signals is essentially equal. In such an implementation, interleaved band-passes are not used, with such an exemplary push-pull signal generation being illustrated in FIG. 4*c*. In the embodiment in FIG. 1*a*, on the other hand, a partition wall is not provided. This embodiment of the loudspeaker system is advantageously combined with the push-pull signal generation in which the two push-pull signals for the four or more sound generators are generated by using interleaved band-passes so that the frequency content of the one push-pull signal is essentially interleaved with the frequency content of the other push-pull signal. However, it is to be noted that interleaved is to be understood as approximately interleaved, since band-pass filters always comprise overlaps between neighboring channels because band-pass filters with a very steep edge cannot be implemented, or only with a very great effort. A band-pass filter implementation as schematically illustrated in FIG. 3*b* is also regarded as an interleaved band-pass filter implementation, even though there are always overlap areas between the different band-pass filters, however, which are attenuated with respect to the frequency content at the center frequency of the respective band-pass filter by at least 6 dB and advantageously by at least 10 dB, for example.

While the push-pull signal generation without interleaved band-pass filters uses a high-pass filter with a cut-off frequency of 150-250 Hz and advantageously 190 to 210 Hz, it is of advantage to not use high-pass filtering when using the interleaved filters, but to also use the low frequency range for generating the two different push-pull signals.

Figure 1C:
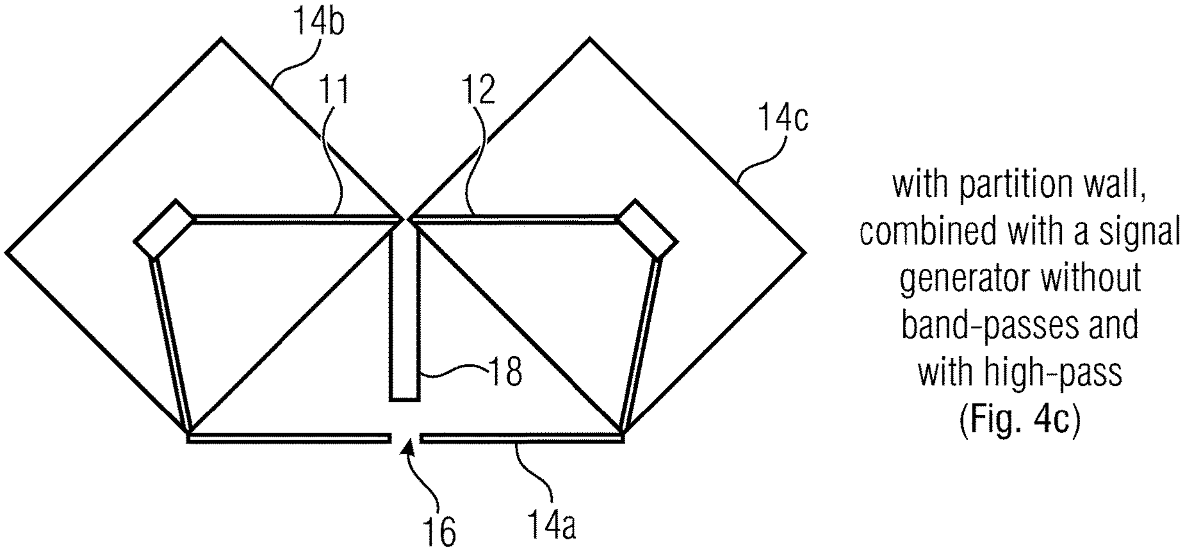
FIG. 1*c* shows a sectional view of the loudspeaker of FIG. 1*a* with an additional partition wall.
Figure 1D:
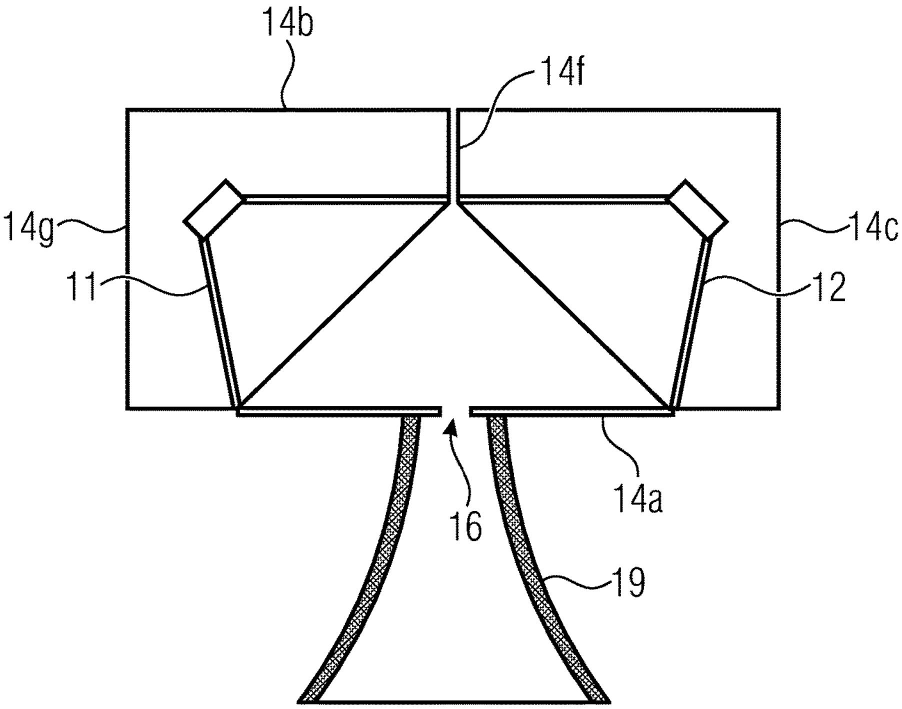
FIG. 1*d* shows a sectional view of a loudspeaker according to the first aspect of the present invention, with a sound impedance adjustment element, such as a horn.

FIG. 1*d* shows an alternative implementation of the loudspeaker system of FIG. 1*a*, wherein the four sound generators are accommodated individually with the housings 14*b*, 14*c*, however, the housing 14 has a more strongly pronounced rectangular shape (as is illustrated in FIG. 1*b* on the right side, for example), e.g., as is used for certain implementations. However, a housing separation 14*f* is provided so as to separate the first and third sound generators 11, 13 and the second and fourth sound generators 12, 15 with respect to their rear volume. In addition, the housing 14 is configured such that, in case of the sound chamber 10, the rear volume is also separated "at the front" from the sound chamber 10.

Furthermore, in the embodiment shown in FIG. 1*d*, in addition to the gap 16, an adjustment element 19, e.g. a horn, is provided so as to adjust the sound impedance at the gap with respect to the sound impedance in the surrounding area of the loudspeaker system along the horn, such that a better sound exits and there is less reflection loss. If, on the other hand, the loudspeaker system is intended to be configured to be flat, e.g., as in a sound system of FIG. 6, an adjustment element is not used, or only a flat one.

Figure 1E:
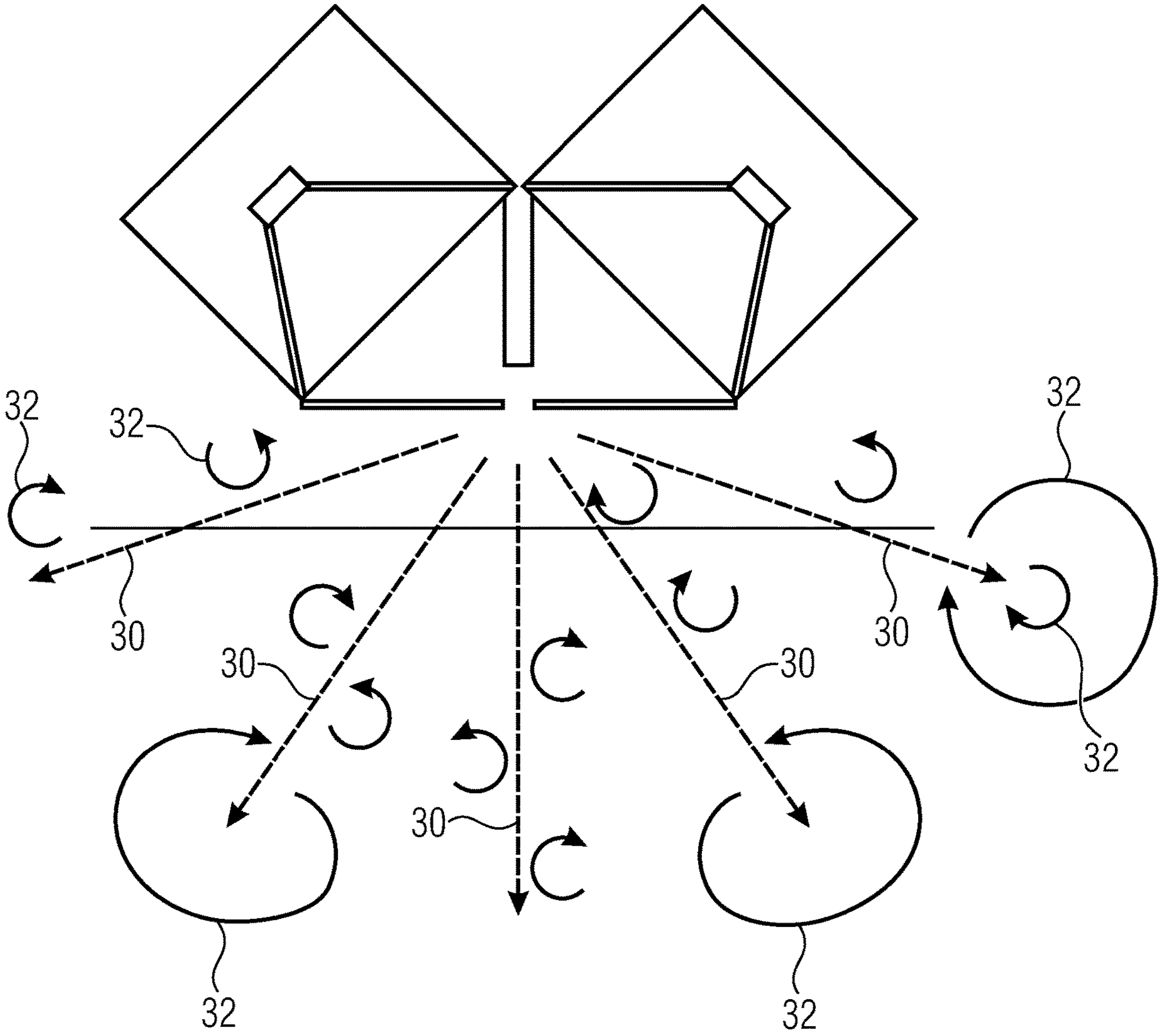
FIG. 1*e* shows a schematic illustration of the sound field with translational and rotatory sound particle velocity vectors in the surrounding area of the loudspeaker according to the first aspect of the present invention.

FIG. 1*e* shows a schematic illustration of the loudspeaker system of FIG. 1*a* with a schematic illustration of the sound field in the surrounding area of the loudspeaker system outside of the gap 16. Sound particle velocity vectors 30 representing the translational sound as it expands away from the gap in the surrounding area of the loudspeaker system are exemplarily drawn in. In addition, schematically illustrated rotating sound particle velocity vectors 32 located in certain directions around, or between, the translational sound particle velocity vectors and representing a rotating sound field are also shown.

In embodiments of the present invention, the gap 16 in the frontal area 14*a* is configured such that the frontal area 14*a* is separated, in a top view, into a left part arranged left of the gap in FIG. 1*b*, and a right part. Advantageously, the division is done in the center so that the gap extends in the frontal area, in the frontal dimension of the sound chamber 10, centrally from top to bottom, however, the deviation from the center may deviate in a tolerance range of +/−20° from the right dimension of the right part perpendicular to the gap. This means that the gap can be shifted towards the right or the left by 20% of the dimension of the right and left parts if the gap were to be arranged in the center.

In addition, as is shown in FIG. 1*b*, the gap may be configured completely from top to bottom. However, the gap is not configured in the lid and in the bottom. In contrast, these two elements are configured continuously without an opening. In embodiments, the gap has a width of between 0.5 cm and 4 cm. Advantageously, the dimension of the gap is in a range of between 1 cm and 3 cm, and particularly advantageously between 1.5 cm and 2 cm.

The partition wall 18 shown in FIG. 1*c* is configured to divide the sound chamber 10 into a first region for the first and third, and possibly further, sound generators, and into a second region for the second and fourth, and possibly further, sound generators, wherein an end of the partition wall is located close to the gap, but separated from the gap, so that the first region for the first and third, and possibly further, sound generators and the second region for the second and fourth, and possibly further, sound generators is in gas communication with the surrounding area of the loudspeaker system through the gap. In addition, the first region and the second region are also in gas communication because the partition wall 18 does not extend completely up to the gap. At the other end, the partition wall is either connected to the first or the second or the third or the fourth sound generator, as is shown in FIG. 1*c*, for example.

Alternatively, however, the partition wall may be arranged between the first and the second or the third and the fourth sound generators, respectively, so that the first and the second or the third and the fourth sound generators, respectively, do not contact each other, however, they are connected to the partition wall such that the gas communication is discontinued in the "rear" region of the partition wall. In embodiments, the height of the first housing 14*b* and the height of the second housing 14*c* is between 4 cm and 20 cm per sound generator pair, and particularly advantageously between 5 cm and 15 cm per sound generator pair. In addition, the width of the first housing and the width of the second housing is between 5 cm and 15 cm and particularly advantageously between 9 cm and 11 cm. Advantageously, the depth is in a range of between 5 cm and 15 cm, and particularly advantageously between 9 cm and 11 cm. An alternative implementation of the housing 14, as is shown in FIG. 1*d*, is similar to the previous embodiment. The width relates to one half of the housing so that the entire housing of the sound generator has a width of between 10 cm and 30 cm. The depth is similar to the dimensions as presented above.

Figure 1F:
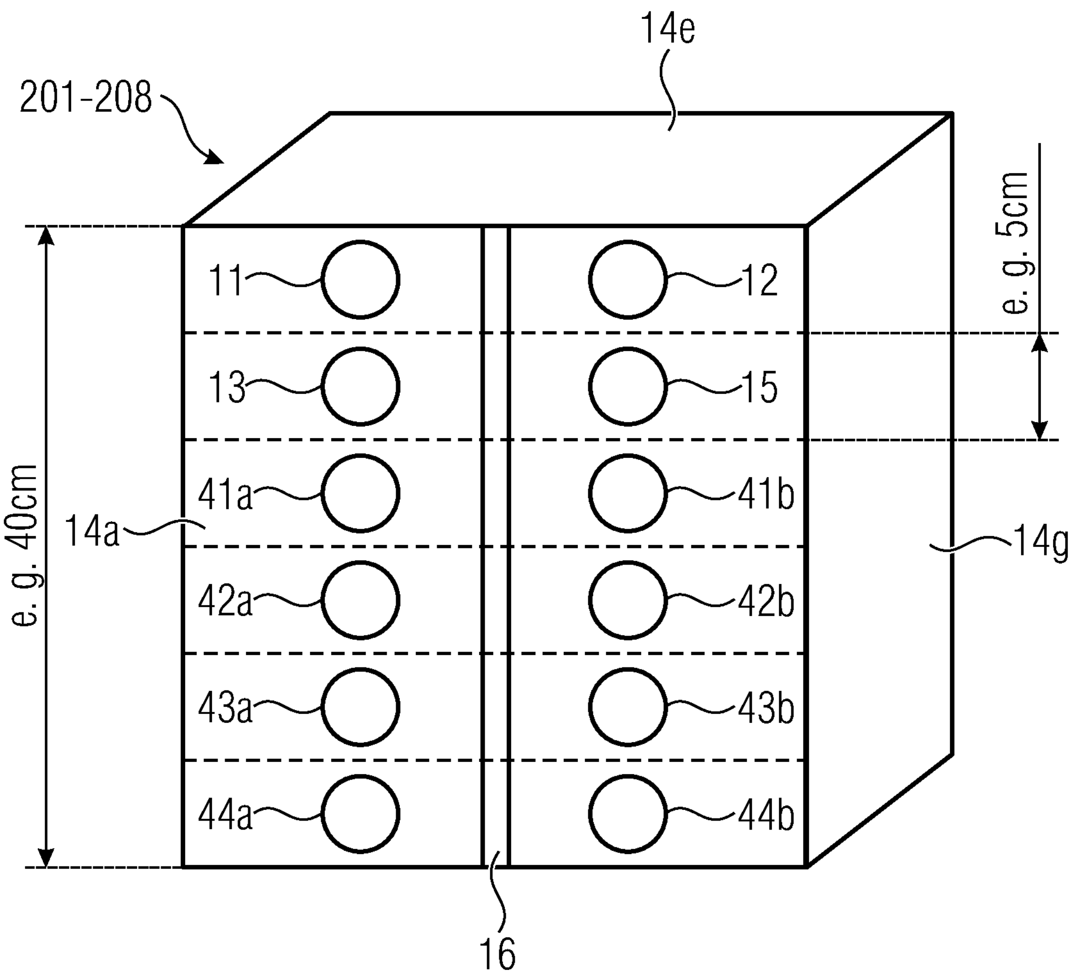
FIG. 1*f* shows a perspective illustration of a loudspeaker system with an array of sound transducers on each side of the gap.

FIG. 1*f* shows a perspective illustration of a loudspeaker system with an array of sound transducers on each side of the gap 16. The individual sound generator pairs are indicated schematically. It is to be noted that the individual sound generators may be aligned above one another and parallel with respect to each other. Apart from the first two pairs 11, 12, 13, 14, further pairs 41*a*, 41*b*, 42*a*, 42*b*, 43*a*, 43*b*, 44*a*, 44*b* are illustrated.

In the loudspeaker system, the first sound generator 11 and the second sound generator 12, the third sound generator 13, and the fourth sound generator 15 are fixed in the housing 14. The housing 14 includes a lid 14*e*, a bottom 14*d*, a frontal wall 14*a*, or a rear wall 14*h*, and/or side walls 14*g*. The gap 16 is configured continuously from top to bottom in the frontal wall 14*a*, with the lid 14*e*, or the bottom 14*d*, or the rear wall 14*h* or the side walls 14*g* being configured continuously. The sound chamber 10 is also configured continuously from top to bottom.

In addition, a first rear chamber 10*a* communicating with a rear side of the first sound generator 11 and a rear side of the third sound generator 13 is configured continuously from top to bottom. The second rear chamber 10*b* communicating with a rear side of the second sound generator 12 and a rear side of the fourth sound generator 15 is also configured continuously from top to bottom. The first rear chamber 10*a*, the second rear chamber 10*b*, and the sound chamber 10 are separated from each other.

The third sound generator 13 with the third emission direction 23 and the fourth sound generator 15 with the fourth emission direction 25 are arranged with respect to each other such that the third emission direction 23 is essentially equal to the first emission direction 21, and the fourth emission direction 25 is essentially equal to the second emission direction 22. In embodiments, in addition to a first pair of the first sound generator 11 and the second sound generator 12 and the second pair of the third sound generator 13 and the fourth sound generator 15, at least one further pair of sound generators 41*a*, 41*b*, 421, 42*b*, 43*a*, 43*b*, 44*a*, 44*b*, 45*a*, 45*b*, 46*a*, 46*b* is arranged in the housing 14 above or below with respect to the first pair or the second pair.

Figure 6:
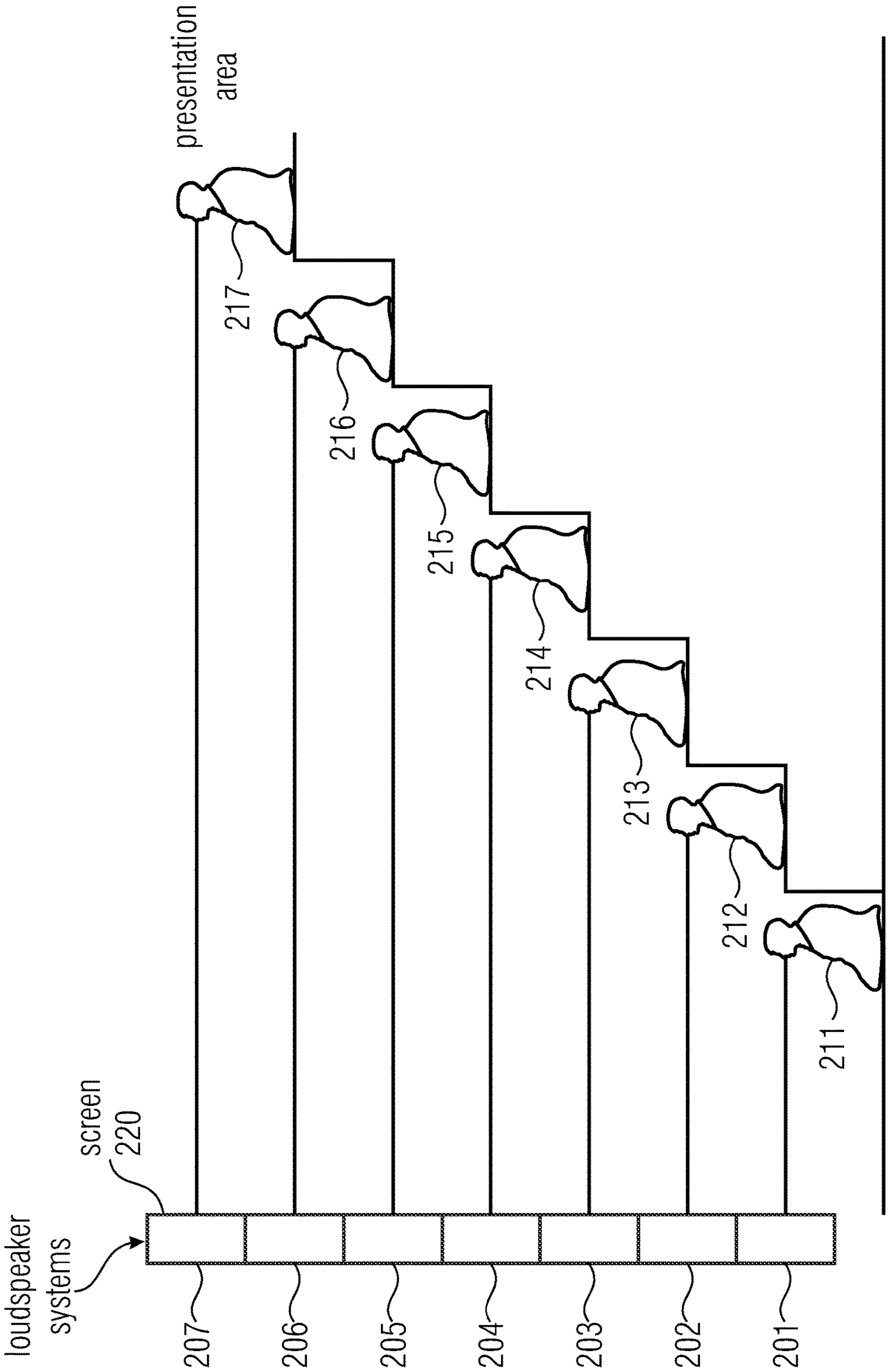
FIG. 6 shows a schematic illustration of a cinema as an exemplary presentation area, in which a sound system consisting of several loudspeaker systems is arranged as a center loudspeaker system behind a screen.
Figure 7:
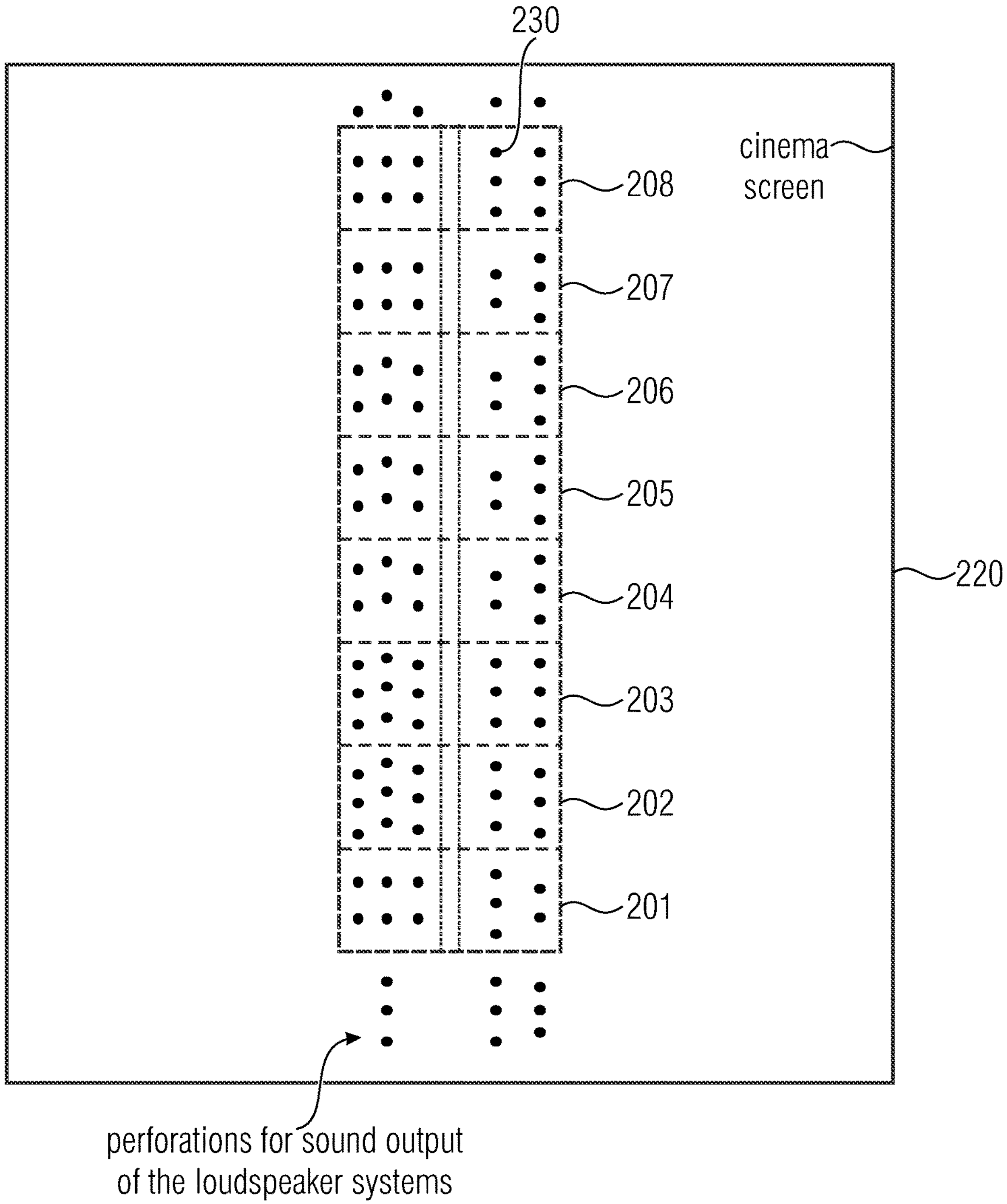
FIG. 7 shows a top view of the screen of FIG. 6*a* with a schematic sound system arranged behind the same, and perforations in the screen.

In FIG. 1*f*, at least 6 pairs of signal generators 11, 12, 13, 15, 41*a*, 41*b*, 421, 42*b*, 43*a*, 43*b*, 44*a*, 44*b*, 45*a*, 45*b*, 46*a*, 46*b* are arranged in the housing 14, wherein, for the sound system of FIG. 6 and FIG. 7, eight pairs in one housing are of advantage per loud speaker system.

Advantageously, a height of the housing 14 is between 30 cm and 60 cm and/or a width of the housing 14 is between 10 cm and 30 cm and/or a depth of the housing 14 is between 5 cm and 20 cm and/or the gap 16 has a width of between 1 cm and 3 cm.

Figure 1G:
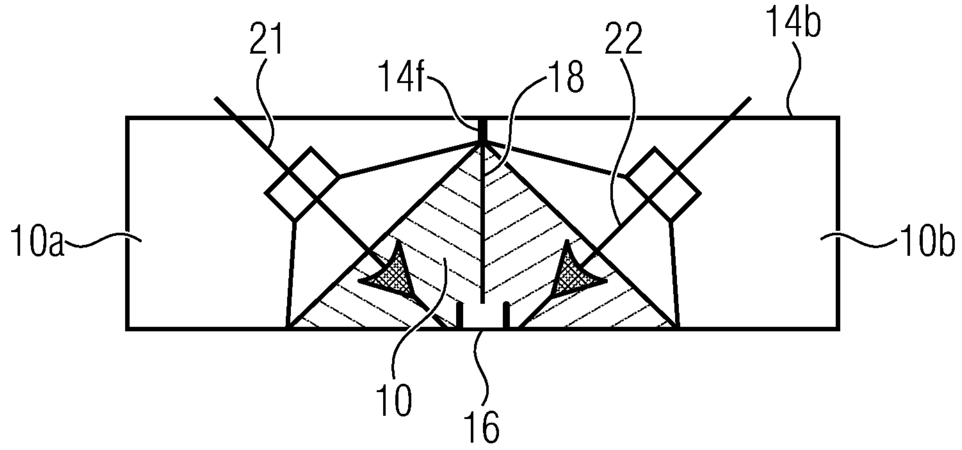
FIG. 1*g* shows a top view from above onto the loudspeaker system of FIG. 1*d*, with its lid removed, with the sound chamber being continuous from top to bottom, and with the rear chambers being separated from each other and continuous from top to bottom.

FIG. 1*g* shows a top view from above onto the loudspeaker system of FIG. 1*d*, with its lid removed, with the sound chamber 10 being continuous from top to bottom, and with the rear chambers 10*a* and 10*b* being separated from each other and continuous from top to bottom. Furthermore, FIG. 1*g* shows the separation 14*f* between the membrane holders of two adjacent sound generators in one pair, wherein this separation 14*f* is configured continuously from top to bottom. In addition, the top view shows the oblique arrangement of the sound generators advantageously in the intersection angle of the first emission direction 21 and the second emission direction 22 in the sound chamber 10, which is larger than 60° and smaller than 120°.

Due to the simpler manufacturing, it is of advantage to arrange the transducers of the respective pairs in parallel so that the emission directions of the generators arranged on top of each other are the same. Thus, all sound generators 11, 13, 41*a*, 42*a*, 43*a*, 44*a* are aligned in the same way and are arranged above one another in a column-like manner. Analogously, the respectively other sound generators of the pairs, i.e. the sound generators 12, 15, 41*b*, 42*b*, 43*b*, 44*b* are aligned in the same way and are arranged above one another in a column-like manner so that they all emit into the same sound chamber, according to the embodiment, having arranged therein the partition wall 18 that also extends through the housing 14 continuously from top to bottom.

Subsequently, on the basis of FIG. 2*a* to FIG. 4*c* and FIG. 5*b*, the second and the third aspects of the present invention are explained, i.e. the second aspect with respect to a signal processor separated from the loudspeaker system, and the third aspect with respect to an integrated variation in which the loudspeaker system is configured to be integrated with the signal processor. In particular, in the embodiment shown in FIG. 2*a*, the loudspeaker system includes the signal processor or signal generator 105 configured to drive the first and third sound generators 11, 13 and the second and fourth sound generators 12, 15 with a first sound generator signal 51 and a second sound generator signal 52, respectively. In the embodiment shown in FIG. 2*a*, one amplifier 324 and 344 each is arranged in front of the sound generators 11, 13, . . . , and 12, 15, . . . , respectively. According to the embodiment, these amplifiers may be integrated into the loudspeaker system or may be integrated into the signal processor. However, if the signal processor is arranged remotely from the loudspeaker system and communicates, e.g., in a wireless manner with the loudspeaker system, it is of advantage to arrange the amplifiers 324, 344 in the loudspeaker system and to transmit the signals 51, 52, e.g., in a wireless manner via a mobile telephone, as will be illustrated on the basis of FIG. 5*a*, from the signal processor 105 to the loudspeaker system, as is exemplarily illustrated in FIG. 1*a*.

In an embodiment, the signal processor includes a combiner 50 configured to overlap a common-mode signal supplied via an input 71 with a first push-pull signal. In the embodiment shown in FIG. 2*a*, this is done through the adder 322. In addition, the combiner is configured to overlap the common-mode signal supplied via the input 71 with a second push-pull signal, which is implemented by the adder 342 in the embodiment shown in FIG. 2*a*. In addition, the sound generator is configured such that the first push-pull signal supplied to the adder 322 and the second push-pull signal supplied to the adder 342 differ from one another. To generate these two push-pull signals, the signal generator includes a push-pull signal generator 60. The push-pull signal generator 60 is configured to obtain a base push-pull signal via an input 72, and to generate the first push-pull signal from the base push-pull signal by using a first push-pull signal processing, exemplarily shown at 326*e* in FIG. 2*a*, and to generate the second push-pull signal by using a second push-pull signal processing, exemplarily shown at 326*f* in FIG. 2*a*.

Figures 2A, 2B:
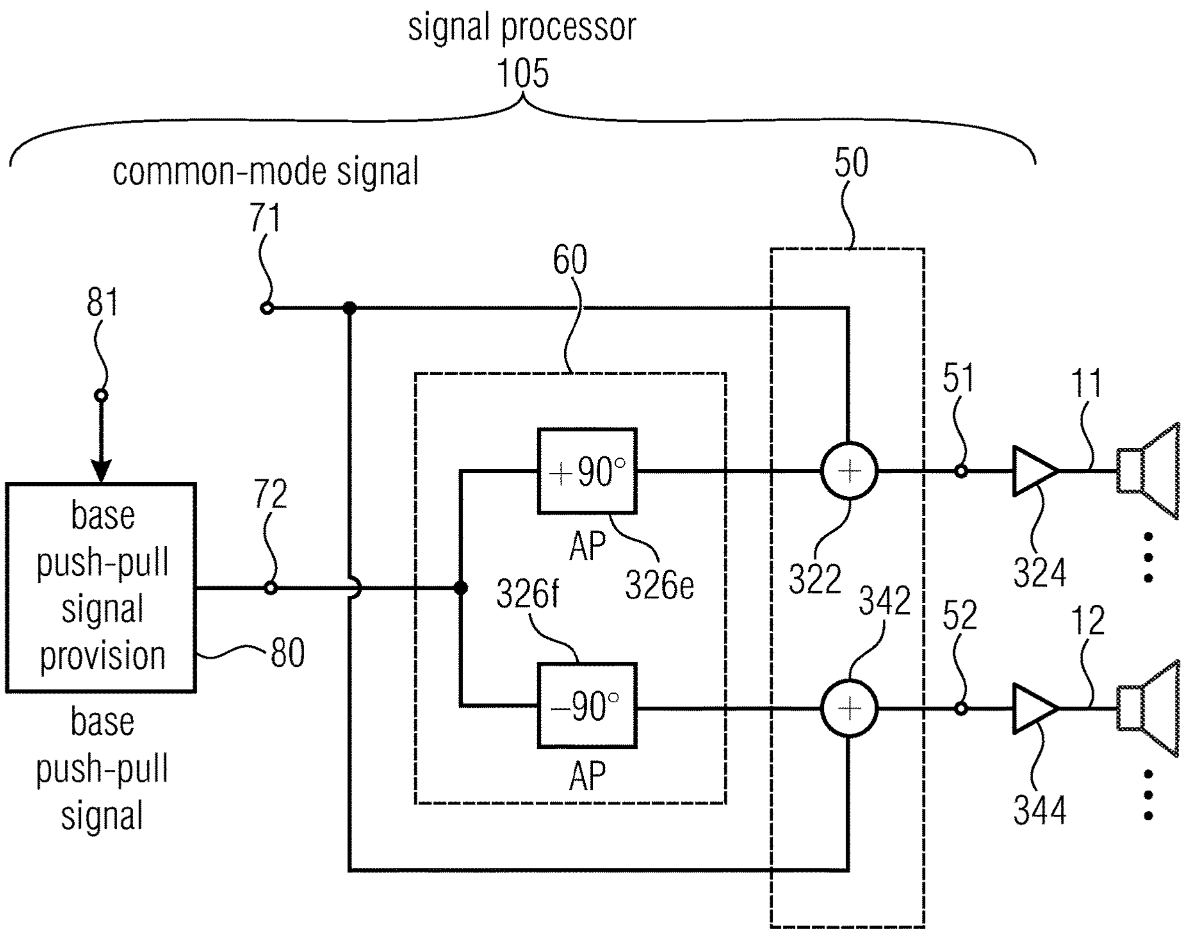
FIG. 2*a* shows a block circuit diagram of a signal processor according to a second aspect of the present invention, with schematically illustrated sound generators of the loudspeaker.
FIG. 2*b* shows a table overview for illustrating different possibilities for providing the base push-pull signal.

The first push-pull signal processing includes all-pass filtering, as is illustrated by "AP" in FIG. 2*a* and in the other figures. In addition, the second push-pull signal processing includes all-pass filtering, or an all-pass filter, as is also illustrated with "AP" in FIG. 2*a* and the other figures. The two all-pass filters 326*e*, 326*f* are configured to achieve a phase shift during the first push-pull signal processing, and to achieve a second phase shift that differs from the first phase shift during the second push-pull signal processing. In embodiments, in the context of the first push-pull signal processing, the phase shift is only +90°, and in the context of the second push-pull signal processing, the phase shift is −90°. This achieves a phase difference of 180° between the two push-pull signals. Alternatively, however, the two push-pull signal processings are configured to achieve a phase shift of between 135° and 225° between the two push-pull signals, wherein, in alternative embodiments, due to the all-pass filters 326*e*, 326*f*, the phase shifts are implemented such that one element generates a positive phase shift, e.g. the element 326*e*, and the other element generates a negative phase shift, e.g. the element 326*f*. Even in such an implementation, which does not necessarily have to have the optimum phase shift of 180° between the two push-pull signals, a certain portion of a rotating sound field is already generated in the sound field schematically shown in FIG. 1*e*. With a phase shift of between 170° and 190° between the two push-pull signals, the efficiency of the generation of the rotating sound field portion is in the best range.

In embodiments, the signal processor is further configured to provide the base push-pull signal for the input 72 of the push-pull signal generator 60. This is achieved by a base push-pull provider 80 that obtains an input signal via an input 81. Different variations for implementing the base push-pull signal provider 80 are illustrated in FIG. 2*b*. In an embodiment, the base push-pull signal is obtained separately, from a separate recording of the rotating sound field. Thus, this push-pull signal is not derived from a common-mode signal or from several common-mode signals, but, so to speak, is recorded "natively" in a sound environment, or is synthesized artificially in a sound synthesis environment. In such a case, the base push-pull provider 80 is configured to receive the base push-pull signal from a corresponding source, e.g., to decode the same and to forward it to the input 72, where, according to the implementation, delays or attenuations/amplifications may be carried out.

In an alternative implementation, in which the rotating sound field has not been recorded separately, the base push-pull signal may be obtained from the side signal of a center-side signal processing. Thus, the base push-pull signal provider is configured to obtain the common-mode signal 71 via the input 81, and any other channel signal, as will be illustrated on the basis of FIG. 4*b*, so as to determine, from a difference of these two signals, the side signal that may then be used directly or may be delayed or attenuated or amplified, according to the implementation.

In yet another alternative implementation, illustrated in FIG. 2*b* with number 3, the base push-pull signal is derived from the common-mode signal 71 by the base push-pull signal provider 80. This is entailed if there is neither a multi-channel signal nor a native recording of the rotating sound field. As is exemplarily shown in FIG. 4*c*, deriving the base push-pull signal is done via high-pass filtering and, possibly, amplification or attenuation of the common-mode signal prior to high-pass filtering or after high-pass filtering.

There are further possibilities for generating a base push-pull signal, wherein a rotating sound field component is always generated, since the first push-pull signal and the second push-pull signal are overlapped with the common-mode signal so that the two sound generators 11, 12 and 13, 15, in the loudspeaker system perform a push-pull signal excitation that can be perceived outside of the gap 16 as a rotating sound field. According to a special generation of the push-pull signal, the rotating sound field will always correspond more to the original physical rotating sound field. Thus, it has been shown that a derivation of the push-pull signal from the common-mode signal at a corresponding overlap through the signal combiner 50 already leads to a significantly improved hearing impression compared to an implementation in which the two sound generators are only driven with a common-mode signal and operate in a common mode-manner.

Figure 3A:
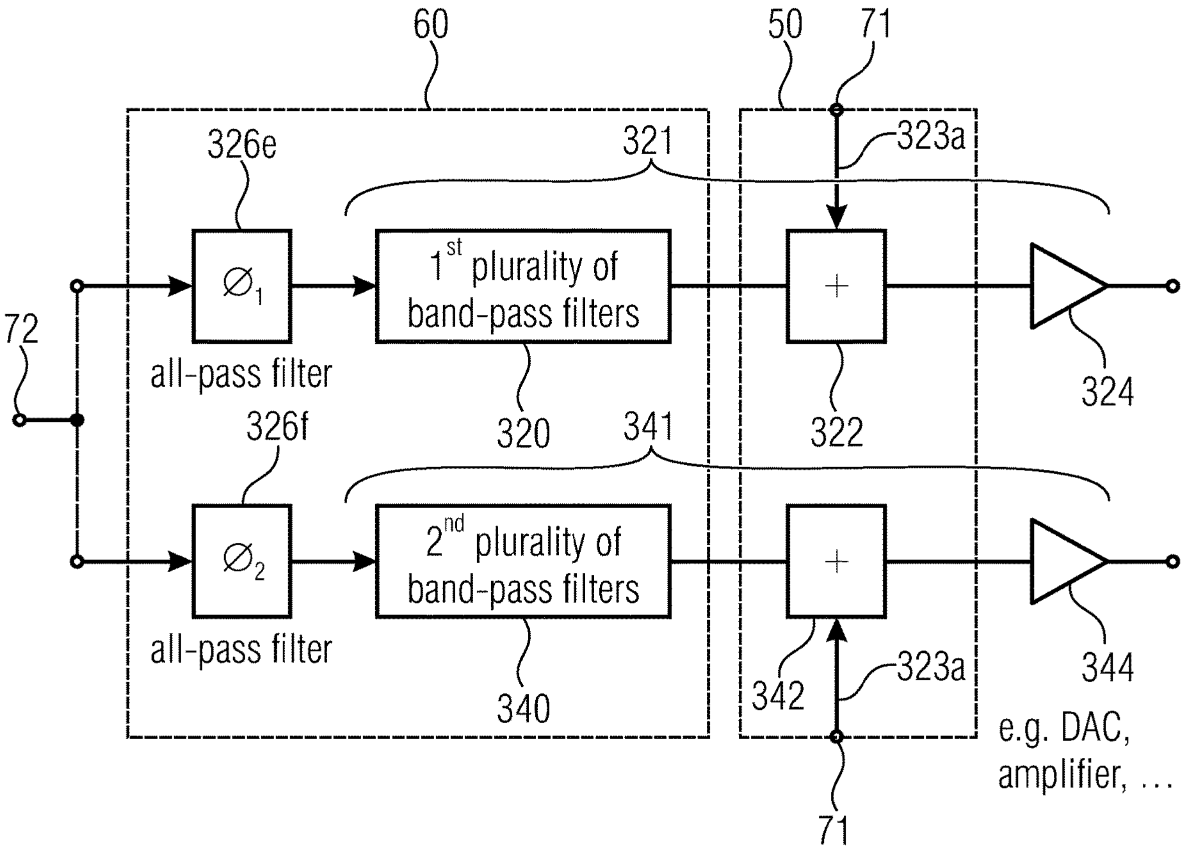
FIG. 3*a* shows an embodiment for illustrating the first and second push-pull signal processing of FIG. 2*a;*
Figure 3B:
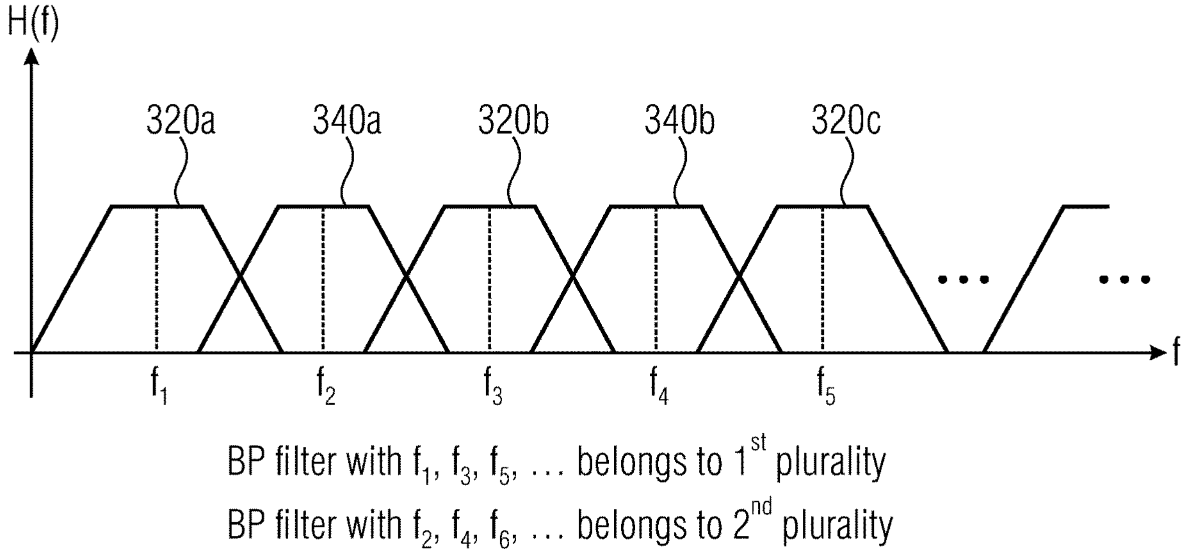
FIG. 3*b* shows a schematic illustration of the two different pluralities of band-pass filters.

FIG. 3*a* shows an embodiment of the push-pull signal generator. Apart from all of the all-pass filters 326*e*, 326*f*, which were already described with respect to FIG. 2*a* and which generate different phase shifts that advantageously have different signs, a first plurality of band-pass filters 320 is provided in the push-pull signal generator for the upper signal path 321, and a second plurality of band-pass filters 340 is provided for the lower signal path, i.e. the signal path 341.

The two band-pass filter implementations 320, 340 differ from each other, as is schematically illustrated in FIG. 3*b*. The band-pass filter with the center frequency f1, illustrated with respect to its transfer function H(f) in FIG. 3*b* with 320*a*, the band-pass filter 320*b* with the center frequency f3, illustrated with 320*b*, and the band-pass filter 320*c* with the center frequency f5 belong to the first plurality of band-pass filters 320 and are therefore arranged in the first signal pass 321, while the band-pass filter 340*a*, 340*b* with the center frequencies f2 and f4 are arranged in the lower signal path 341, i.e. they belong to the second plurality of band-pass filters. Thus, the band-pass filter implementation 320, 340 are configured to be interleaved with each other, or they are configured to be interdigital, so that the two signal transducers in one sound generator element, e.g. the sound generator element 100 of FIG. 1, emit signals with the same overall bandwidth, but differently in such a way that every second band is attenuated in each signal. This makes it possible to omit the partition ridge since the mechanical partition is replaced by an "electric" partition. The bandwidths of the individual band-pass filters in FIG. 3*b* are only shown schematically. Advantageously, the bandwidths increase from the bottom to the top, in the shape of an advantageously approximated Bark scale. In addition, it is of advantage to divide the entire frequency range into at least 20 bands so that the first plurality of band-pass filters includes 10 bands and the second plurality of band-pass filters also includes 10 bands, which then reproduce the entire audio signal through overlap due to the emission of the sound transducers.

Figure 4A:
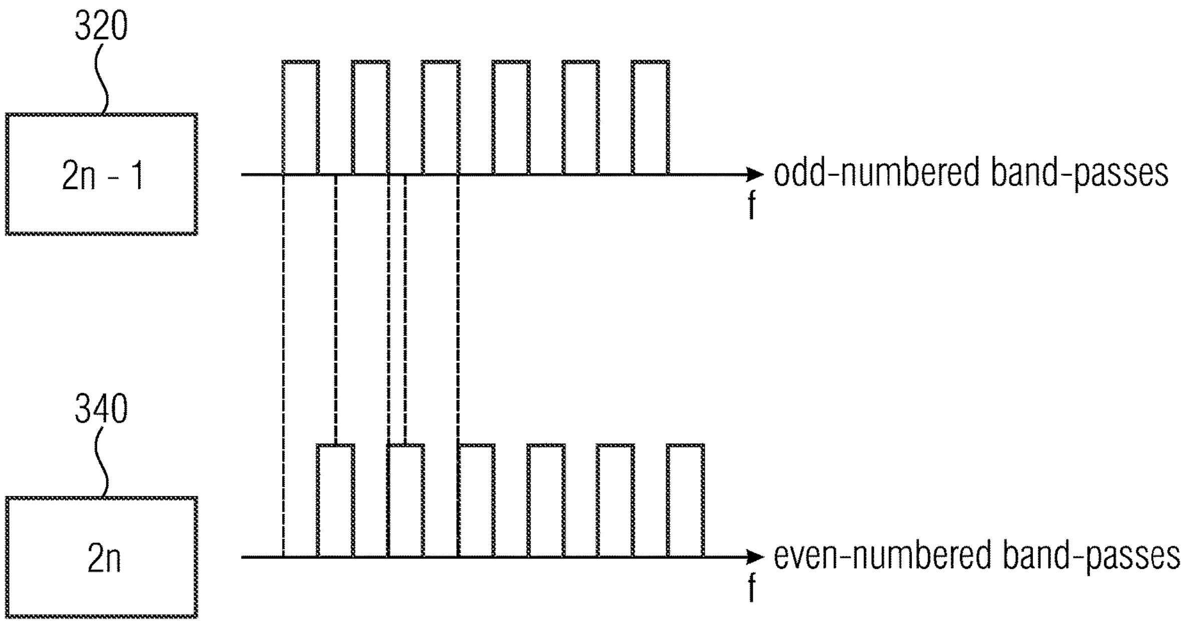
FIG. 4*a* shows a further schematic illustration of interleaved or interlocked or interlaced band-passes, divided into odd and even-numbered band-passes.

FIG. 4*a* shows a schematic illustration of using 2n even-numbered band-passes in the generation of the upper control signal, while using 2n−1 (odd-numbered band-passes) for the generation of the lower control signal.

Other subdivisions, or implementations, of the band-pass filters in a digital way, e.g. by means of a filterbank, a critically sampled filterbank, a QMF filterbank, or any type of Fourier transformation, or a MDCT implementation with subsequent combination or different processing of the bands can also be used. Similarly, the different bands may also have a constant bandwidth from the lower end to the upper end of the frequency range, e.g. from 50 to 10,000 Hz or above. In addition, the number of the bands may also be significantly larger than 20, e.g. 40 or 60 bands, so that each plurality of band-pass filters reproduces half of the entire number of bands, e.g. 30 bands in the case of 60 bands overall.

FIG. 3*a* illustrates an implementation of the signal combiner 50, wherein the output signal of the first plurality of band-pass filters and the common-mode signal 323*a* available at the common-mode signal input 71 are added via the adder 322. Accordingly, the second adder 342 in the signal combiner 50 adds the output signal of the second plurality of band-pass filters 340 and the common-mode signal 323*a* available at an input 71 of FIG. 2*a*, for example. In addition, the first all-pass filter 326*e* and the second all-pass filter 326*f* obtain the base push-pull signal. The base push-pull signal 72 is supplied directly to both all-pass filters 326*e*, 326*f* in the embodiment shown in FIG. 3*a*. Alternatively, amplification/attenuation may be provided either for both branches 321 and 341, or only for one branch. This could be useful, e.g., if the two sound generators in the loudspeaker system as shown in FIG. 1*a* are not configured exactly symmetrically, or are not arranged exactly symmetrically.

In addition, FIG. 3*a* illustrates that the amplifiers 324, 344 may be configured not only as amplifiers, but also as digital-analog transducers, or as an input stage of a loudspeaker system. Then, the radio distance between a signal processor, or signal generator, 105 and the loudspeaker system would be located between the elements 322 and 324, or 342 and 344. In such an implementation, each loudspeaker system is configured to receive two input signals, i.e. an input signal for the sound generators 11, 13 on the one hand, and 12, 15 on the other hand, and to process, and particularly to amplify, these input signals accordingly, so as to obtain the control signals for the membranes of the sound generators 11, 12, 13, 15, or for further sound generators.

Figure 4B:
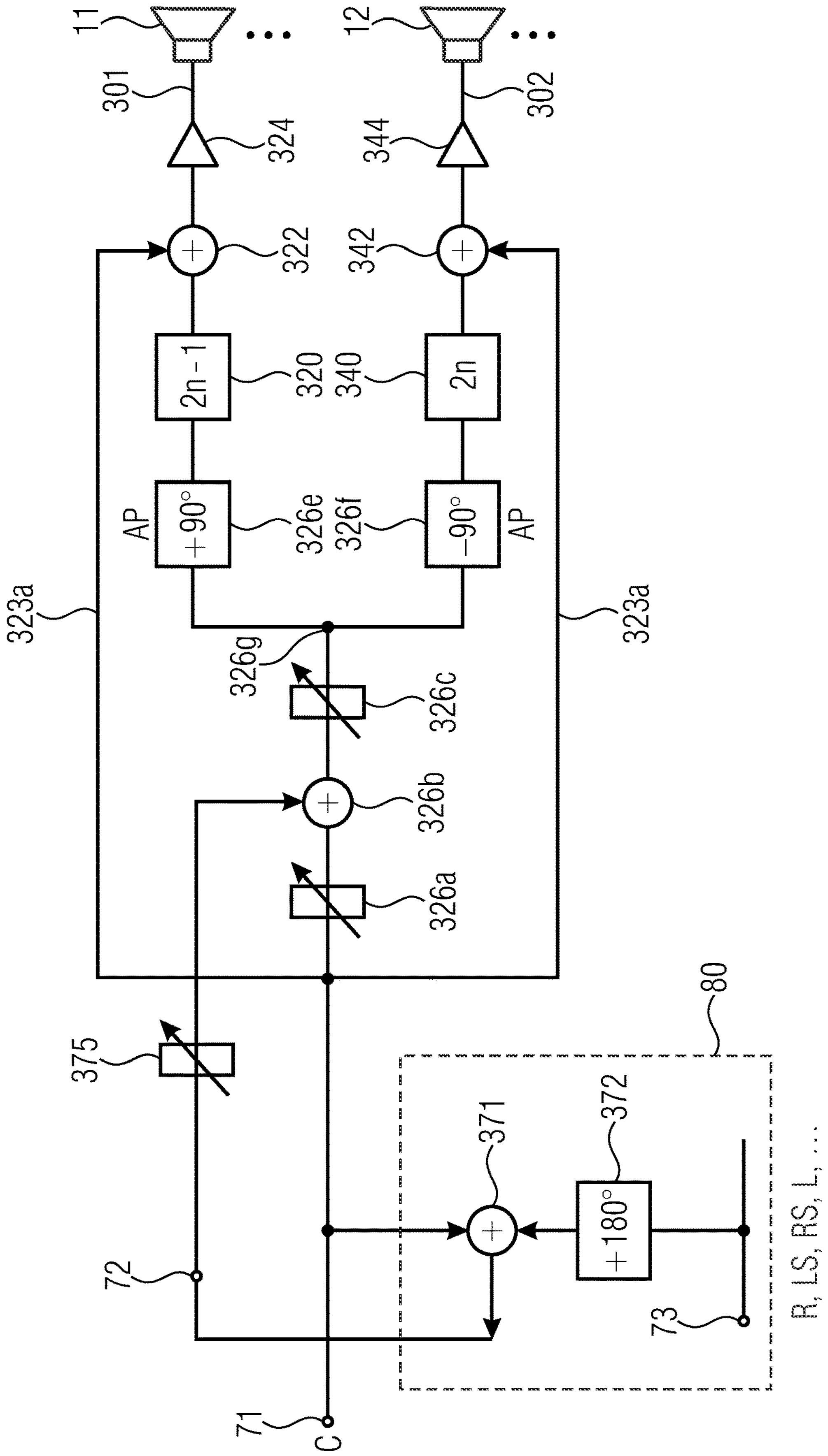
FIG. 4*b* shows an embodiment for generating the push-pull signal with a derivation of the base push-pull signal from a difference between two channels.

FIG. 4*b* shows an embodiment of a signal processor, in which the base push-pull signal provider 80 is configured as a side signal generator. For example, if the common-mode signal is a left signal at the input 71, the base push-pull signal 72 may be obtained by calculating a difference signal between the common-mode signal at the input 71 and another channel of a two or multi-channel representation, e.g., which may contain a right channel R, a center channel C, a left rear channel LS, or a right rear channel RS.

To obtain a difference formation, a phase reversal 372 may be applied to the other channel at the input 73, achieving a phase shift of 180°. Advantageously, this is achieved if the signal is available as a difference signal between two poles. Then, the phase reversal 372 is simply achieved by plugging in the channel in a "reverse" manner into an adder 371, so to speak. The adder 371 is therefore advantageously configured such that the common-mode signal is plugged in at its one input "correctly", and the other channel signal is plugged in at its other input "incorrectly", so as to achieve the phase shift of 180° indicated by the phase shifter 372. In other implementations, other phase shifts may be used if an actual phase shifter is used instead of the "incorrect plug-in".

The difference signal at the output of the adder then represents the base push-pull signal 72, which may then be further processed. In the embodiment illustrated in FIG. 4*b*, the push-pull signal generator includes further elements, i.e. the potentiometers, or amplifiers, with an amplification of less than one 375, 326*a*, and the adder 326*b* and the potentiometer 326*c*. In contrast to the embodiment of FIG. 2*a* or FIG. 3*a* where the push-pull signal has been fed directly into the branch point 326*b* from the output 72 and from there into the two all-pass filters, or interleaved band-pass filters, the base push-pull signal in FIG. 4*b* is modified prior to branching, i.e. by an amplifier, or a potentiometer 375. Furthermore, the base push-pull signal is mixed with the common-mode signal at the input 71 via the adder 326*b*, and the result of the mixing is amplified by the amplifier, or the potentiometer 326*c*. However, it is to be noted that, if the amplifier 375 has an amplification factor of 1, if the amplifier 326*a* has an amplification factor of 0, i.e. attenuates fully, and if the amplifier 326*c* has an amplification factor of 1, the implementation of FIG. 4*b* is identical to the implementation of FIG. 2*a*, apart from the interleaved band-pass filters 320, 340, wherein, in the embodiment shown in FIG. 4*a* and particularly in FIG. 4*b*, odd-numbered band-passes are arranged in the upper branch, and even-numbered band-passes are arranged in the lower branch. However, the arrangement of even-numbered and odd-numbered band-passes may be done reversely so that the signal processed with the all-pass filter 326*e* is further processed with even-numbered band-pass filters. In the embodiments shown in FIG. 4*b*, it is further to be noted that the order of the all-pass filter and the filterbank may also be reversed. In alternative embodiments, the all-pass filters may also be omitted, since, in such a case, the filterbanks already lead to the push-pull signals being different in the upper branch and in the lower branch. Thus, an implementation with interleaved band-pass filters but without all-pass filters, where the branch point is the direct input into the filterbanks 320, 340, and the output of the filterbanks is directly connected to the corresponding input of the adders 322, 342, also leads to a sound signal at the output of the gap comprising translational or rotatory components.

In addition, the use of the all-pass filters has the advantage that the partition wall in the sound chamber 10 can be omitted, as is illustrated in FIG. 1*a*. However, if interleaved filterbanks are not provided, e.g. as in FIG. 2*a* or in FIG. 4*c*, it is of advantagee to provide the partition wall 18 in the sound chamber 10, as is illustrated in FIG. 1*c*.

Figure 4C:
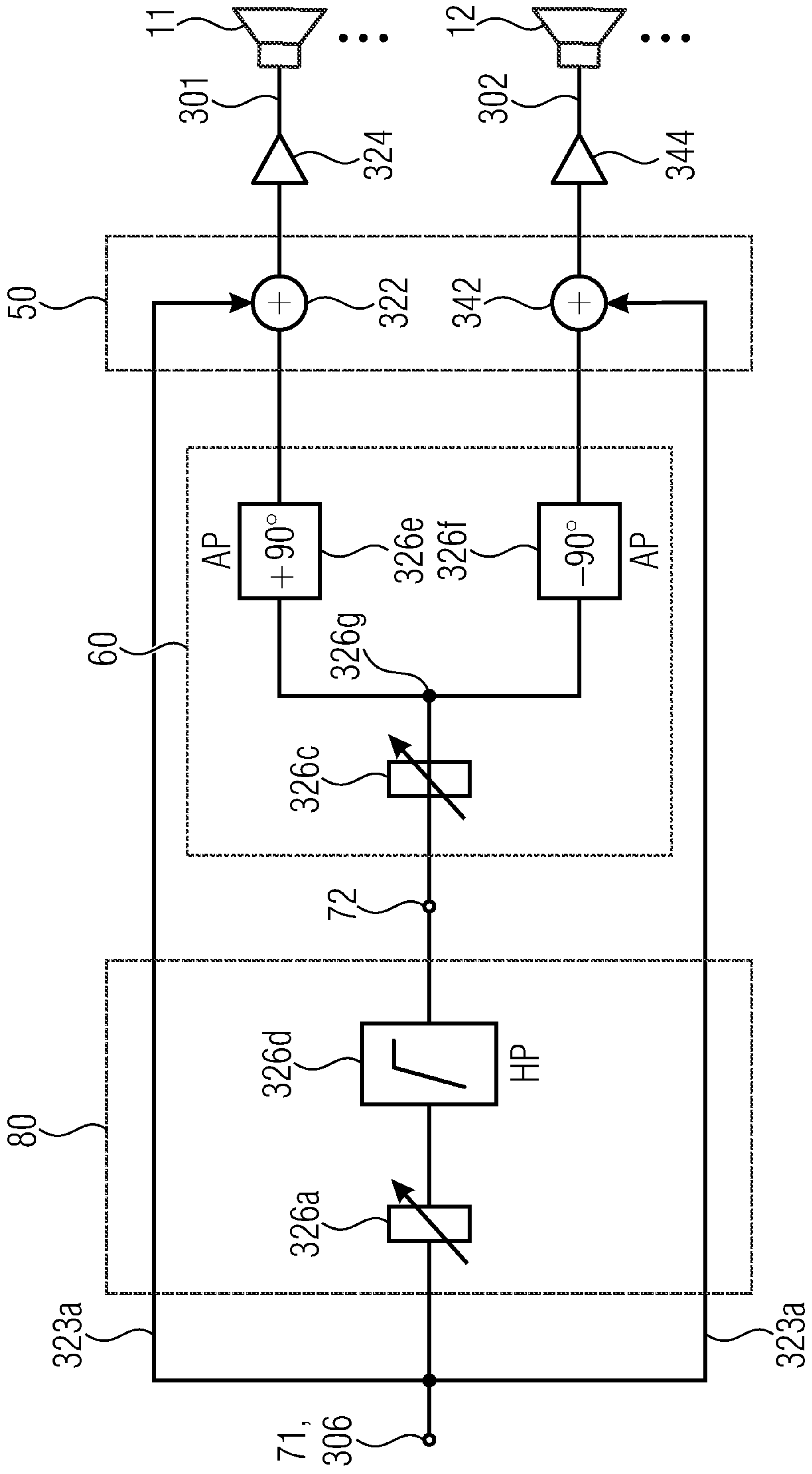
FIG. 4*c* shows an alternative illustration for generating the base push-pull signal from the common-mode signals.

FIG. 4*c* shows a special implementation of the base push-pull signal provider 80 of FIG. 2*a*, in the variation number of no. 3 of FIG. 2*b*. Here, the common-mode signal is amplified, or attenuated, at the input 306, which corresponds to the input 71, by an adjustable amplifier, or by a potentiometer 326*a*, and is then high-pass filtered via a high-pass filter (HP) as illustrated at 326*d*. The base push-pull signal 72 is then located at the output of the high-pass filter 326*d*, which is then, analogously to the implementation of FIG. 4*b*, amplified/attenuated with an adjustable amplifier/potentiometer 326*c* so as to be supplied to the branch point 326*g* via which, according to the implementation, the amplified or unchanged/unmodified base push-pull signal 72 is provided to the two all-pass filters 326*a*, 326*f*. The first push-pull signal and/or the second push-pull signal are then located at the output of the all-pass filters, which are then combined with the common-mode signal via the adders 322, 342, exemplarily implementing the signal combiner 50, as is illustrated by the lines 323*a*. According to the implementation, the control signals for the sound generators 11, 12, 13, 15 may then be amplified by the amplifier 324, 344 and may be supplied to the sound generators 11, 12, 13, 15.

Figure 5A:
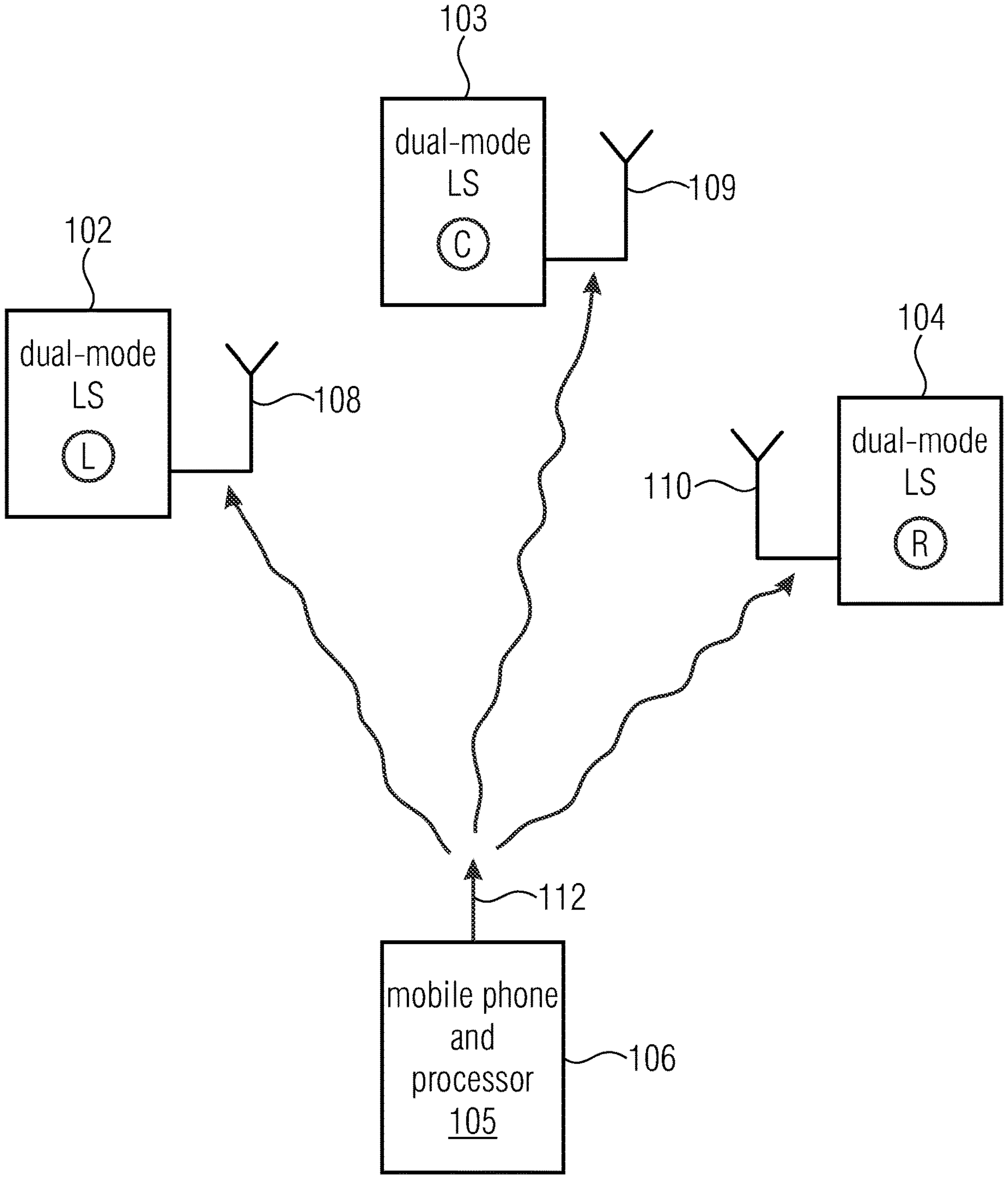
FIG. 5*a* shows a schematic illustration of a scenario with several dual-mode twin transducer loudspeakers and a mobile device, such as a mobile telephone, for driving the same.

FIG. 5*a* shows an implementation of the present invention in connection with a mobile device, such as a mobile telephone. A mobile device 106 includes an output interface symbolized by a transmission antenna 112. In addition, each loudspeaker system 102, 103, 104, which may advantageously be implemented as in FIG. 1 a to FIG. 1*e*, includes an input interface symbolized by input antennas 108, 109, 110. The mobile telephone 106 includes the signal processor, or signal generator, 105 illustrated in FIG. 2*a*, 3*a*, 4*b*, or 4*c* as the part that is located between the input 71, 73 and the output amplifiers 324, 344. Advantageously, the corresponding output amplifiers 324, 344 are arranged in each of the individual loudspeaker systems 102, 103, 104, and the signals to be amplified are supplied to the output of the respected input interfaces of the corresponding loudspeaker systems 102, 103, 104. In the scenario shown in FIG. 5*a*, the audio signal is a three-channel signal with a left channel L, a center channel C, and a right channel R. Advantageously, the audio signal comes from an audio library in the mobile telephone 106 or originates from a remote audio server, such as a streaming service, etc. Advantageously, the interface symbolized by the transmission antenna 112 is a near-field interface, such as a Bluetooth interface.

According to the implementation, the mobile telephone, or the signal processor or signal generator 105, may be configured, as has been illustrated on the basis of FIG. 4*b*, to calculate the base push-pull signal as a difference between a left channel and, e.g., a right channel. If, however, in deviation from FIG. 5*a*, a multi-channel representation with, e.g., five channels exists, as is illustrated in FIG. 4*b*, the base push-pull signal provider 80 may also be configured to calculate the side signal as a difference between a left downmix channel and a right downmix channel. The left downmix channel is calculated by addition of left and left rear (LS=left surround or LR=left rear) and possibly using an additional addition with a weighted center channel C, e.g. weighted with the factor 1.5. In addition, the right downmix channel is calculated by addition of the right channel R and the right rear channel (RS=right surround or RR=right rear) and possibly with a weighted center channel C, e.g. weighted with a factor of 1.5. Then, the side signal is obtained by subtraction of the left and the right downmix channels.

Alternatively, the side signal may also be obtained by subtraction of LS and RS, without using the push-pull signal. To calculate the side signal, any number of channel pairs or a downmix channel and an original channel, etc. may be used, and, as illustrated in FIG. 4*b*, the same common-mode signal then added to the two push-pull signals by the signal combiner does not have to be used to calculate the base push-pull signal.

Figure 5B:
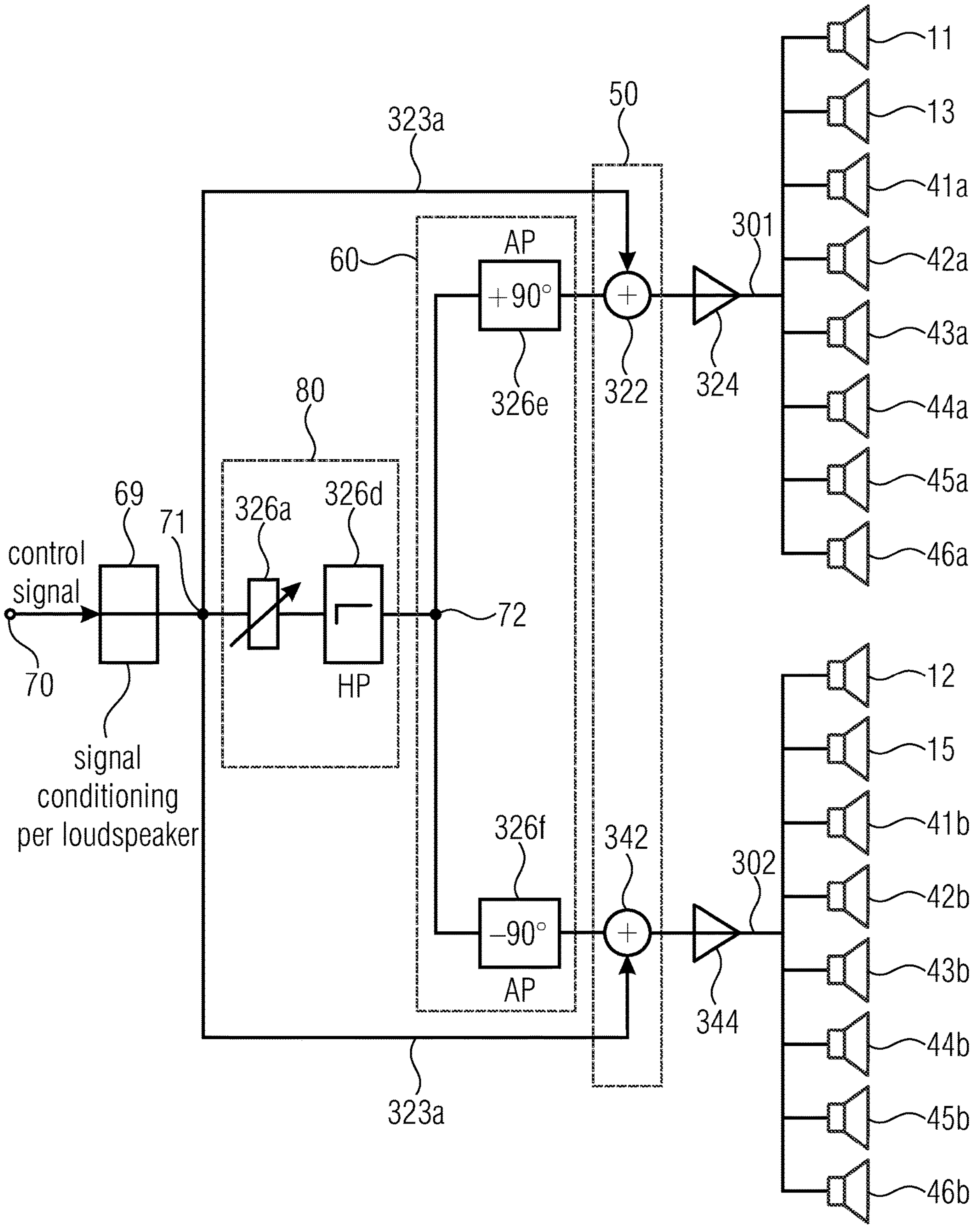
FIG. 5*b* shows a schematic illustration of a loudspeaker system of FIG. 1*d* and FIG. 1*e*, with eight sound generators per array and a mutual array control.

FIG. 5*b* shows a schematic illustration of a loudspeaker system of FIGS. 1*d* and 1 e with eight sound generators per array and a mutual array control. In addition, the loudspeaker system includes a signal generator, as described with respect to the FIGS. 3*a*, 3*b*, 4*a*, 4*b*, 4*c*, where FIG. 5*b* exemplarily illustrates the variation of FIG. 4*c*.

In addition, the signal generator includes a signal conditioning stage 69 configured to adjust an input signal 70 from which the common-mode signal 71, or the first push-pull signal, or the second push-pull signal is derived, or to adjust the first sound generator signal 51 for the first sound generator 11 and the third sound generator 13, or the second sound generator signal 52 for the second sound generator 12 and the fourth sound generator 15 with respect to a signal power and/or with respect to an amplification of higher frequencies compared to lower frequencies. Thus, the signal conditioning stage 69 in FIG. 5*a* is configured to separately perform an individual level adjustment, or control, and a treble adjustment for the loudspeaker system.

As can be seen in FIG. 6, in a presentation area such as a cinema or a concert hall, but also in an outdoor presentation area, there may the case that a sound system consisting of several loudspeaker systems 201, 202, 203, 204, 205, 206, 207 of FIG. 1*f* has different distances to rows of seats, or rows of listeners 211, 212, 213, 214, 215, 216, 217. This is the case due to the offset arrangement of the rows of seats, so that listeners of a row of seats located further up can see over listeners of a row of seats located further below. By means of the signal conditioning stage, each loudspeaker system is adjusted for the listening row opposite to the respective system so as to compensate the level loss due to the greater distance and to compensate the treble loss due to the greater air distance from the loudspeaker system to the respective listener. A cut-off frequency for the treble compensation is in the range of 2 to 4 kHz. The larger the distance, the more the stage 69 has to lift the level, on the one hand, and to amplify the higher frequencies on the other hand.

A sound system includes at least one first loudspeaker system 201 and one second loudspeaker system 202 configured according to any of claims 1 to 28, wherein the second loudspeaker system 202 is arranged on top of the first loudspeaker system 201, and wherein the housing of the first loudspeaker system 201 is configured to be separate from the housing of the second loudspeaker system 202. In FIG. 6, the sound system is configured as a tower of seven loudspeaker systems 201 to 207.

The first loudspeaker system 201 has a first signal conditioning stage 69 and the second loudspeaker system 202 has its own second signal conditioning stage, wherein the first signal conditioning stage 69 and the second conditioning stage are adjusted such that a sound level of a sound signal emitted by the first loudspeaker system 201 is lower than a sound level of a sound signal emitted by the second loudspeaker system 201, or such that higher frequencies of a sound signal emitted by the first loudspeaker system 201 are amplified less than higher frequencies of a sound signal emitted by the second loudspeaker system 201.

As is illustrated in FIG. 6, the sound system is located in a presentation area in which a listening area is located, wherein the listening area comprises a first listening row 211 and a second listening row 212, and possibly further rows 213, 214, 215, 216, 217, wherein the second listening row 212 is arranged above and offset with respect to the first listening row 211. The first listening row 211 has a first distance to the first loudspeaker system 201, and the second listening row 212 has a second distance to the second loudspeaker system 201.

The first signal conditioning stage 69 and the second signal conditioning stage are adjusted such that a sound level of a sound signal emitted by the first loudspeaker system 201 is lower than a sound level of a sound signal emitted by the second loudspeaker system 201, and/or that higher frequencies of a sound signal emitted by the first loudspeaker system 201 are amplified less than higher frequencies of a sound signal emitted by the second loudspeaker system 201.

In particular, the first signal conditioning stage 69 and the second signal conditioning stage are adjusted such that a first sound level adjustment or an amplification of higher frequencies is implemented proportionally depending on the first distance and the second distance.

The first loudspeaker system 201 and the second loudspeaker system 202 are connected to a sound signal source in order to reproduce a center channel of a multi-channel sound format. In addition, between the sound system and the listening rows, a display wall 220 is arranged, e.g., a screen or any other image display means that may also include a screen. It is more permeable for sound emitted by the sound system in the area in front of the sound system than in an area adjacent to the sound system. In the case of a screen, such as a cinema screen, configured to show an image or a movie, perforations 230 are formed in an area in front of the sound system, as can be seen in FIG. 7, and there are no perforations or fewer perforations in the area adjacent to the sound system than in the area in front of the sound system. Thus, the sound emitted is only slightly attenuated by the screen 220 or not at all. Nevertheless, attenuation for each loudspeaker system can be compensated for by the stage 69 in each case so that each listening row receives the same good sound quality. Other screens are uniformly perforated throughout so that no consideration needs to be given to any loudspeakers located behind them from the outset when manufacturing the screen.

In general, it is of advantage to provide a separate loudspeaker system for each listening row. Furthermore, the position in the center behind the screen is particularly predestined for the reproduction of the center channel of a multi-channel format, as is also shown in FIG. 4*b* at 71. A subwoofer can be added to the sound irradiation arrangement to improve performance at particularly low frequencies. Typically, however, the center channel is used more for speech, such as that of the narrator of a play, so that the sound system delivers excellent audio quality even without a subwoofer in the center, because not only the translational component of the sound field is excited but also the rotatory component, and the emitted sound signal of the sound system therefore sounds particularly natural.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A loudspeaker system, comprising:

a first sound generator with a first emission direction, and a second sound generator with a second emission direction, wherein the first sound generator and the second sound generator are arranged with respect to each other such that the first emission direction and the second emission direction intersect in a sound chamber;

a third sound generator with a third emission direction, and a fourth sound generator with a fourth emission direction, wherein the third sound generator and the fourth sound generator are arranged with respect to each other such that the third emission direction and the fourth emission direction intersect in the sound chamber;

a housing that accommodates the first sound generator and the second sound generator, the third sound generator and the fourth sound generator, and the sound chamber, wherein the housing comprises a gap configured to enable gas communication between the sound chamber and a surrounding area of the loudspeaker system; and a signal generator configured to drive the first sound generator and the third sound generator with a first sound generator signal, and to drive the second sound generator and the fourth sound generator with a second sound generator signal, wherein the signal generator comprises a combiner configured to combine a common-mode signal and a first push-pull signal so as to acquire the first sound generator signal, and to combine the common-mode signal and a second push-pull signal so as to acquire the second sound generator signal, wherein the second push-pull signal differs from the first push-pull signal.

2. The loudspeaker system according to claim 1, wherein the first sound generator comprises a first front side and a first rear side, wherein the second sound generator comprises a second front side and a second rear side, wherein the third sound generator comprises a third front side and a third rear side, wherein the fourth sound generator comprises a fourth front side and a fourth rear side, wherein the first front side and the second front side and the third front side and the fourth front side are directed towards the sound chamber so that the sound chamber is defined by the first front side, the second front side, the third front side, and the fourth front side, and the housing, and wherein the gap is configured in a frontal area of the housing, separating the sound chamber from the surrounding area of the loudspeaker system.

3. The loudspeaker system according to claim 2, wherein the gap in the frontal area is configured such that the frontal area is divided into a top view left part and a top view right part, wherein the left part comprises a left dimension perpendicular to the gap that is equal to a right dimension of the right part perpendicular to the gap within a tolerance of +/-20% of the dimension.

4. The loudspeaker system according to claim 2, wherein, in the top view, the gap in the frontal area is configured completely from the bottom to the top.

5. The loudspeaker system according to claim 2, wherein the housing is configured to separate a first rear area of the first sound generator behind the first rear side from a second rear area of the second sound generator behind the second rear side, and to separate the first rear area and the second rear area from the surrounding area of the loudspeaker.

6. The loudspeaker system according to claim 1, wherein the housing comprises a bottom portion to limit the sound chamber towards the bottom, and a lid portion to limit the sound chamber towards the top.

7. The loudspeaker system according to claim 1, wherein the gap comprises a width of between 0.5 cm and 4 cm.

8. The loudspeaker system according to claim 1, wherein a partition wall is configured in the sound chamber, dividing the sound chamber into a first area for the first sound generator and the third sound generator, and into a second area for the second sound generator and the fourth sound generator, wherein an end of the partition wall is located near the gap and spaced apart from the gap so that the first area and the second area are in gas communication with the surrounding area of the loudspeaker system through the gap.

9. The loudspeaker system according to claim 8, wherein the end of the partition wall is spaced apart from the gap by between 0.5 cm and 4 cm.

10. The loudspeaker system according to claim 8, wherein the partition wall is connected to the housing or the first sound generator or the second sound generator and the third sound generator and the fourth sound generator at another end opposite the end near the gap so as to separate, at the other end, the first area from the second area with respect to a gas communication.

11. The loudspeaker system according to claim 1, wherein an adjustment element is arranged at the gap so as to adjust a sound impedance at the gap with respect to a sound impedance in the surrounding area of the loudspeaker system.

12. The loudspeaker system according to claim 1, wherein the signal generator comprises a push-pull signal generator, wherein the push-pull signal generator is configured to acquire a base push-pull signal, and to generate the first push-pull signal from the base push-pull signal by using first push-pull signal processing, and to generate the second push-pull signal by using second push-pull signal processing, wherein the first push-pull signal processing comprises a first all-pass filter, and wherein the second push-pull signal processing comprises a second all-pass filter, wherein the first all-pass filter differs from the second all-pass filter.

13. The loudspeaker system according to claim 12, wherein the first push-pull signal processing comprises a first plurality of band-pass filters, and the second push-pull signal processing comprises a second plurality of band-pass filters, wherein the first plurality of band-pass filters and the second plurality of band-pass filters are configured to be interleaved with respect to each other so that a band-pass channel of the first plurality of band-pass filters comprises a passage range in terms of frequency that corresponds to a blocking range in terms of frequency in the second plurality of band-pass filters.

14. The loudspeaker system according to claim 13, wherein the first plurality of band-pass filters comprises at least two band-pass filters with a first center frequency and a third center frequency, and wherein the second plurality of band-pass filters comprises at least two band-pass filters comprising a second center frequency and a fourth center frequency, wherein the first center frequency, the second center frequency, the third center frequency, and the fourth center frequency are arranged in an increasing order in terms of frequency, and wherein the first plurality of band-pass filters comprises a blocking range at the second center frequency and the fourth center frequency, and wherein the second plurality of band-pass filters comprises a blocking range at the first center frequency and the third center frequency.

15. The loudspeaker system according to claim 12, wherein the signal generator comprises a base push-pull signal provider configured to derive the base push-pull signal from the common-mode signal, or derive the base push-pull signal from two channel signals of a multi-channel representation comprising at least two channels, or acquire, via an input portion, a separate audio signal that is acquired separately from the common-mode signal.

16. The loudspeaker system according to claim 15, wherein the base push-pull signal provider is configured to subject the common-mode signal to high-pass filtering when deriving the base push-pull signal, or to amplify or to attenuate the common-mode signal so as to acquire the base push-pull signal.

17. The loudspeaker system according to claim 15, wherein the base push-pull signal provider is configured to determine a difference signal from the two channel signals, and to derive the base push-pull signal from the difference signal.

18. The loudspeaker system according to claim 1, wherein the first push-pull signal processing is configured to cause a first phase shift, and wherein the second push-pull signal processing is configured to cause a second phase shift, wherein the second phase shift differs from the first phase shift, or wherein one of the two phase shifts is a positive phase shift and the other one of the two phase shifts is a negative phase shift, or wherein the first push-pull signal processing and the second push-pull signal processing are configured to each cause a phase shift so that a phase difference between the first push-pull signal and the second push-pull signal is between 135° and 225°, or wherein the first phase shift is between 70° and 110°, and the second phase shift is between −70° and −110°.

19. The loudspeaker system according to claim 1, wherein the signal generator comprises a signal conditioning stage configured to adjust, with respect to a signal power and/or with respect to an amplification of higher frequencies in contrast to lower frequencies, an input signal from which the common-mode signal, or the first push-pull signal, or the second push-pull signal is derived, or the first sound generator signal for the first sound generator and the third sound generator, or the second sound generator signal for the second sound generator and the fourth sound generator.

20. The loudspeaker system according to claim 1, wherein the first sound generator, the second sound generator, the third sound generator, and the fourth sound generator are fixed in the housing, wherein the housing comprises a lid, a bottom, a frontal wall, or a rear wall, or sidewalls, wherein the gap is configured in the frontal wall continuously from top to bottom, wherein the lid, or the bottom, or the rear wall, or the sidewalls are configured continuously.

21. The loudspeaker system according to claim 20, wherein a height of the housing is between 30 cm and 60 cm, or wherein a width of the housing is between 10 cm and 30 cm, or wherein a depth of the housing is between 5 and 20 cm, or wherein the gap comprises a width of between 1 cm and 3 cm.

22. The loudspeaker system according to claim 1, wherein the sound chamber is configured continuously from top to bottom.

23. The loudspeaker system according to claim 22, wherein the first rear chamber, the second rear chamber, and the sound chamber are each separated from one another.

24. The loudspeaker system according to claim 1, wherein a first rear chamber communicating with a rear side of the first sound generator and a rear side of the third sound generator is configured continuously from top to bottom, or wherein a second rear chamber communicating with a rear side of the second sound generator and a rear side of the fourth sound generator is configured continuously from top to bottom.

25. The loudspeaker system according to claim 1, wherein the third sound generator with the third emission direction, and the fourth sound generator with the fourth emission direction are arranged with respect to each other such that the third emission direction is essentially equal to the first emission direction, and the fourth emission direction is essentially equal to the second emission direction.

26. The loudspeaker system according to claim 25, wherein at least 6 pairs of signal generators are arranged in the housing.

27. The loudspeaker system according to claim 1, wherein, in addition to a first pair of the first sound generator and the second sound generator, and a second pair of the third sound generator and a fourth sound generator, at least one further pair of sound generators is arranged in the housing below or above with respect to the first pair or the second pair.

28. A sound system, comprising:

a first loudspeaker system configured according to claim 1; and a second loudspeaker system configured according to claim 1, wherein the second loudspeaker system is arranged on top of the first loudspeaker system, and wherein the housing of the first loudspeaker system is configured to be separate from the housing of the second loudspeaker system.

29. The sound system according to claim 28, wherein the first loudspeaker system comprises a first signal conditioning stage; and wherein the second loudspeaker system comprises a second signal conditioning stage, wherein the first signal conditioning stage and the second signal conditioning stage are adjusted such that a sound level of a sound signal emitted by the first loudspeaker system is lower than a sound level of a sound signal emitted by the second loudspeaker system, or such that higher frequencies of a sound signal emitted by the first loudspeaker system are amplified less than higher frequencies of a sound signal emitted by the second loudspeaker system.

30. A presentation area, comprising:

a sound system comprising:

a first loudspeaker system configured according to claim 1; and a second loudspeaker system configured according to claim 1, wherein the second loudspeaker system is arranged on top of the first loudspeaker system, and wherein the housing of the first loudspeaker system is configured to be separate from the housing of the second loudspeaker system; and a listening area, wherein the listening area comprises a first listening row and a second listening row, wherein the second listening row is arranged above and offset with respect to the first listening row.

31. The presentation area according to claim 30, wherein the first listening row comprises a first distance to the first loudspeaker system, and the second listening row comprises a second distance to the second loudspeaker system, wherein the first loudspeaker system comprises a first signal conditioning stage; and wherein the second loudspeaker system comprises a second signal conditioning stage, wherein the first signal conditioning stage and the second signal conditioning stage are adjusted such that a sound level of a sound signal emitted by the first loudspeaker system is lower than a sound level of a sound signal emitted by the second loudspeaker system, or such that higher frequencies of a sound signal emitted by the first loudspeaker system are amplified less than higher frequencies of a sound signal emitted by the second loudspeaker system.

32. The presentation area according to claim 31, wherein the first signal conditioning stage and the second signal conditioning stage are adjusted such that a sound level adjustment or an amplification of higher frequencies is implemented proportionally depending on the first distance and the second distance.

33. The presentation area according to claim 30, wherein the first loudspeaker system and the second loudspeaker system are connected to a sound signal source so as to reproduce a center channel of a multi-channel sound format, or wherein, a display wall is arranged between the sound system and the listening rows that is more permeable for sound emitted by the sound system in the area in front of the sound system than in an area adjacent to the sound system.

34. The presentation area according to claim 33, wherein the display wall is configured to reproduce an image or a movie, or wherein there are perforations in an area in front of the sound system, and there are no perforations or fewer perforations in an area adjacent to the sound system than in the area in front of the sound system.

35. A method for manufacturing a loudspeaker system comprising a first sound generator with a first emission direction, and a second sound generator with a second emission direction, a third sound generator with a third emission direction, and a fourth sound generator with a fourth emission direction, comprising:

arranging the first sound generator and the second sound generator with respect to each other such that the first emission direction and the second emission direction intersect in a sound chamber arranging the third sound generator with a third emission direction and the fourth sound generator with a fourth emission direction such that the third emission direction and the fourth emission direction intersect in the sound chamber;-and accommodating the loudspeaker system with a housing that accommodates the first sound generator and the second sound generator, the third sound generator and the fourth sound generator, and the sound chamber, wherein the housing comprises a gap configured to enable gas communication between the sound chamber and a surrounding area of the loudspeaker system; and driving the first sound generator and the third sound generator with a first sound generator signal, and driving the second sound generator and the fourth sound generator with a second sound generator signal, wherein the driving comprises combining a common-mode signal and a first push-pull signal so as to acquire the first sound generator signal, and superimposing the common-mode signal and a second push-pull signal so as to acquire the second sound generator signal, wherein the second push-pull signal differs from the first push-pull signal.

* * * * *